United States Patent
Bookspan et al.

(10) Patent No.: US 6,629,129 B1
(45) Date of Patent: Sep. 30, 2003

(54) SHARED VIRTUAL MEETING SERVICES AMONG COMPUTER APPLICATIONS

(75) Inventors: Matthew D. Bookspan, Kirkland, WA (US); Robert. D. Donner, Redmond, WA (US); Deborah L. Dubrow, Kirkland, WA (US); Markham F. MacLin, Kirkland, WA (US); Paul C. Poon, San Jose, CA (US); John E. Tafoya, Morgan Hill, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,694

(22) Filed: Jun. 16, 1999

(51) Int. Cl.[7] ............................................... G06F 15/16
(52) U.S. Cl. ..................... 709/204; 709/235; 709/232; 705/8; 705/9; 345/751; 345/759
(58) Field of Search ................................ 709/200, 204, 709/205, 232; 345/7, 751, 759; 348/1; 705/9, 8

(56) References Cited

U.S. PATENT DOCUMENTS

| | | | | |
|---|---|---|---|---|
| 5,627,978 A | * | 5/1997 | Altom et al. | 345/758 |
| 5,801,700 A | * | 9/1998 | Ferguson | 345/748 |
| 5,999,208 A | * | 12/1999 | McNerney et al. | 345/757 |
| 6,047,288 A | * | 4/2000 | Kurosawa et al. | 707/10 |
| 6,195,091 B1 | * | 2/2001 | Harple et al. | 345/751 |
| 6,363,352 B1 | * | 3/2002 | Dailey et al. | 705/9 |
| 2001/0012304 A1 | * | 8/2001 | Agraharam et al. | 370/487 |

* cited by examiner

Primary Examiner—David Wiley
Assistant Examiner—Phuoc H Nguyen
(74) Attorney, Agent, or Firm—Christensen O'Connor Johnson Kindness PLLC

(57) ABSTRACT

A method and system for controlling the interaction between a primary application and a virtual meeting application and assigning the responsibility between them for providing user interface components is provided. The virtual meeting application provides the functionality for a virtual meeting and provides user interface components related to transient state changes in the virtual meeting. The virtual meeting application is called from the user interface provided by the primary application. In response to state change event notification sent by the virtual meeting application to the primary application, the primary application updates user interface components that supplement the user interface provided by the virtual meeting application. The virtual meeting application is invoked through an application interface that is exposed by the virtual meeting application in a global name space. The application interface may be associated with a predefined mode that specifies which of the user interface components provided by the virtual meeting application will be displayed in a manner that appears to be part of the primary application's user interface and which of the virtual meeting user interface components will be suppressed.

42 Claims, 17 Drawing Sheets

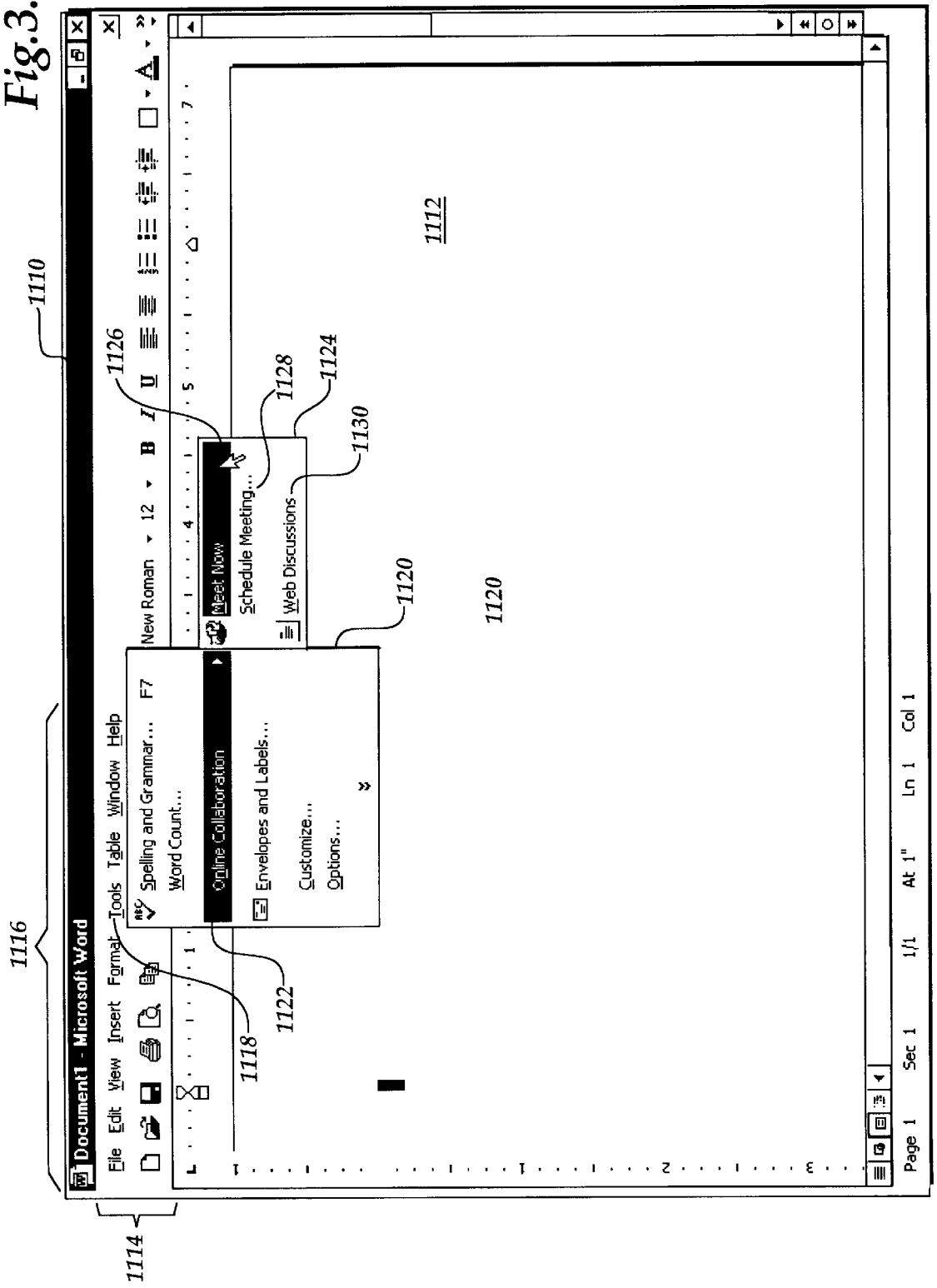

SHARED VIRTUAL MEETING SERVICES AMONG COMPUTER APPLICATIONS

FIELD OF THE INVENTION

This invention relates generally to computer applications, and more particularly, to a method and system for providing shared virtual meeting services to one or more computer applications.

BACKGROUND OF THE INVENTION

The growing complexity of the business environment has resulted in many business projects being assigned to workgroups rather than a single employee. The emergence of electronic data communications removed the requirement that workgroups be limited to personnel that are physically proximate and allowed workgroups to be assigned by the members' skills instead of their physical location. For instance, members of these workgroups may now be physically distributed between different cubicles or offices on the same floor, different floors in an office building, different office buildings on a corporate campus or different campuses located in the same or different regions of the world. Workgroups may also be separated when workgroup members travel or telecommute.

Business reports, financial spreadsheets and design schematics are examples of projects that may be created by a collaborative effort of a workgroup. These projects are increasingly being produced using primary application programs operating on a personal computer that edit a data file. The data file will be referred to below as an "electronic document" or simply "document." The collaborative editing of an electronic document by workgroup members may be accomplished by printing a paper copy of the document and distributing the printed paper copy to each member of the workgroup for revision. One way to collaboratively edit the paper copy of the document may be to distribute a single paper copy sequentially from workgroup member to workgroup member so that the changes made by one workgroup member are incorporated into the document before subsequent changes are made. Another alternative is to distribute a paper copy to each member of the workgroup so that each member independently makes changes to the document which later have to be consolidated into a single, final, document.

Connecting personal computers to communication networks has relieved the workgroup members from forwarding paper copies, but in many cases the collaboration process remains the same. Instead of forwarding a paper copy sequentially from workgroup member to workgroup member, an electronic document is forwarded as an electronic data file from workgroup member to workgroup member over a computer network, with each workgroup member editing the electronic document as it stands revised by a previous workgroup member. The electronic document is then sent on to the next workgroup member. Also, like the distribution of paper copies to each workgroup member, a separate copy of the electronic document might be distributed electronically over a computer network as an electronic data file to all workgroup members simultaneously. The workgroup members revise their own copy of the electronic document and return it to a central workgroup member that is responsible for incorporating the various changes into a final document. To assist in these revision scenarios, some application programs provide tools for tracking changes made by various members of the workgroup. Examples of revision tracking tools can be found in Microsoft Word 97, manufactured by Microsoft Corporation, Redmond, Wash.

Instead of requiring each member of the work group to individually edit a document, it is desirable to allow for the collaborative editing of an electronic document in real-time by the workgroup members. The computers of the workgroup members are linked together in a virtual meeting using a virtual meeting application over a computer network. In a virtual meeting, the computer systems of the members of a workgroup (and other participants) are linked together electronically through a computer network with the ability to share a computer application on a meeting host's computer to edit an electronic document. An example of a virtual meeting application is Microsoft NetMeeting, available from Microsoft Corporation, Redmond, Wash.

The prior art method for establishing a virtual meeting to collaboratively edit an electronic document is a cumbersome process involving manually switching between applications. This manual switching requires that the user understand all of the individual application's user interfaces well enough to both form the virtual meeting and to enable the sharing of an electronic document for online collaboration. For instance, to enable the sharing of an electronic document, the meeting host must first start a document editing application and open a subject electronic document in that application. The meeting host then has to manually start the virtual meeting application, join the meeting participants to the virtual meeting and enable document sharing. When the meeting host manually returns to the document editing application, the meeting participants are able to collaboratively edit the subject electronic document in real-time.

Besides the inconvenience to the user caused by repeatedly switching between the document editing application and the virtual meeting application to initiate, administer, and end a virtual meeting, the user may be confused by an unfamiliar and perhaps inconsistent user interface presented by the virtual meeting application. In addition, the absence of the ability of the user to start and conduct a virtual meeting from within the document editing application may leave users unaware of the possibility that electronic documents can be collaboratively edited during a virtual meeting or may simply discourage collaborative editing because the user believes that the installation and operation of a separate virtual meeting application requires too much technical knowledge and effort to make the collaborative editing worthwhile.

Further, making changes to the state of the virtual meeting while it is in progress is cumbersome and beyond the skill level of many users. To make changes in the virtual meeting state (e.g., adding or deleting meeting attendees; enabling or disabling a meeting attendee's ability to collaboratively edit a document in real time; ending the virtual meeting) requires switching from the document editing application to the virtual meeting application, changing the conferencing state in the virtual meeting application, and then returning to the document editing application. These steps require that the meeting host not only understand the user interfaces of both the document editing application and the virtual meeting application, the meeting host must also understand what functionality is provided by which application and how to access the functionality through that application's user interfaces.

It would be desirable to provide a method and system for integrating the services provided by a virtual meeting application into one or more document editing applications so that a user can start, administer, and end a virtual meeting through the document editing application's user interface. The integration of the virtual meeting application's functionality into the document editing application should be transparent to the user and should appear to the user that the virtual meeting is being administered by the document editing application while the virtual meeting application is actually responsible for providing the services that form, monitor, and administer the virtual meeting. It is also desirable that the virtual meeting application display to the user some transient state information pertinent to the virtual meeting through portions of its own user interface that would be inefficient to recreate in the document editing application, while suppressing certain other user interface components that are better supplemented by components provided by the document editing application. Overall, a consistent user interface should be presented to the user for easily forming, administering, and ending a virtual meeting from the document editing application, with each application providing portions of that user interface as is most efficient. To accomplish both the sharing and supplementing of user interfaces between the document editing application and the virtual meeting application, the document editing application and the virtual meeting application should be able to communicate state change information regarding the virtual meeting between each other. The present invention is directed to providing a computer implementable method for accomplishing some or all of these goals.

SUMMARY OF THE INVENTION

In accordance with this invention, a computer implemented method for providing virtual meeting services and online collaboration capabilities to one or more document editing or "primary" applications is provided. The virtual meeting services and online collaboration capabilities are provided by a virtual meeting application but are controlled by and appear as part of the primary application's user interface. The primary application and the virtual meeting. application share responsibility for the user interface, with some components of the user interface provided by the primary application and other components provided by the virtual meeting application. In general, the user interface for controlling the virtual meeting is provided as a supplemental user interface (relative to the virtual meeting application), while transient user interfaces are provided by the virtual meeting application to keep the user apprised of state changes in the virtual meeting that are under the control of that application. The actual communication functions that support the virtual meeting are provided by the virtual meeting application through an application interface exposed by the virtual meeting application in a global name space.

In accordance with other aspects of the invention, portions of a user interface for controlling and administering a virtual meeting are provided by the primary application while other portions of the user interface are provided by the virtual meeting application. The portions of the user interface provided by the primary application, referred to as "Supplementary User Interfaces" or "SUI," seamlessly integrate control of the virtual meeting services provided by the virtual meeting application into the primary application's user interface in a manner that is consistent and familiar to a user of the primary application. A supplementary user interface allows a user to directly form or join an online meeting from the primary application without having to even be aware of the existence of the virtual meeting application. In an actual embodiment of the invention, a virtual meeting is started by selecting a menu item from a menu provided in the user interface of the primary application. In an actual embodiment of the invention, a supplementary user interface includes a toolbar. The toolbar provides controls that include a list of current meeting participants involved in the virtual (online) meeting and command buttons to: add or remove meeting attendees from the virtual meeting; enable or disable online collaboration; start chat and whiteboard capabilities in the virtual meeting; or, end (hang up) the virtual meeting.

In accordance with yet further aspects of the invention, the supplemental user interfaces provided by the primary application are enabled in part through state change event notifications received from the virtual meeting application when the virtual meeting detects a state change in the virtual meeting. In turn, the supplemental user interface may send state change requests to the virtual meeting application that request a change of state in the virtual meeting such as adding or removing a meeting participant from the virtual meeting. After the virtual meeting application makes the state change that was requested, it sends a state change event notification to the primary application, which uses the information in the state change event notification to update the supplemental user interface (or for other control or informational purposes). For instance, as the virtual meeting application detects that a meeting attendee has been added or removed from the virtual meeting, it sends an event state notification containing such information to the primary application, which adds or removes meeting attendees from an online meeting toolbar.

In accordance with further aspects of the invention, the virtual meeting application provides transient user interfaces that appear as part of or on top of the primary application's user interface (on one or more of the meeting participant's computers). The transient user interfaces typically contain information regarding transient states administered by the virtual meeting application during the virtual meeting. For instance, in an actual embodiment of the invention if a meeting participant joins the virtual meeting, the virtual meeting application generates and displays a pop-up window informing the meeting participant that another meeting attendee has joined the conference. In addition to transient user interfaces displaying state information, a transient user interface may display instructions pertinent to an event that occurred in the virtual meeting. For instance, if a meeting attendee moves a mouse while not in control of a document collaboration, the virtual meeting application displays a transient user interface (a pop-up window) providing the instruction "Click The Mouse To Take Control." The transient user interface may be displayed on one or all of the meeting attendees' computers depending on the context of the event.

In accordance with still further aspects of the invention, one or more application interfaces may be exposed by the virtual meeting application in a global name space. Each application interface may be associated with one or more predefined modes that determine which of the virtual meeting user interface components that will be displayed or suppressed during an instance of a virtual meeting that is instantiated through that application interface. In an actual embodiment of the invention, portions of the user interface displayed to the user are provided by the virtual meeting application when events relevant to the formation and state changes occur during the virtual meeting. The primary application provides the general command and control functions through supplemental user interface components.

In accordance with still further aspects of the invention, a virtual meeting may be scheduled through the primary application's user interface. The method and system for scheduling a virtual meeting are described in a co-pending commonly described U.S. patent application Ser. No. 09/191,626, filed Nov. 13, 1998 and entitled Automatic Scheduling and Formation of a Virtual Meeting Over a Computer Network, the subject matter of which is incorporated herein by reference.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a pictorial representation of an application user interface provided by a primary application having a supplemental user interface for forming and controlling a virtual meeting;

DETAILED DESCRIPTION OF THE PREFERRED EMBODIMENT

Figure 1:
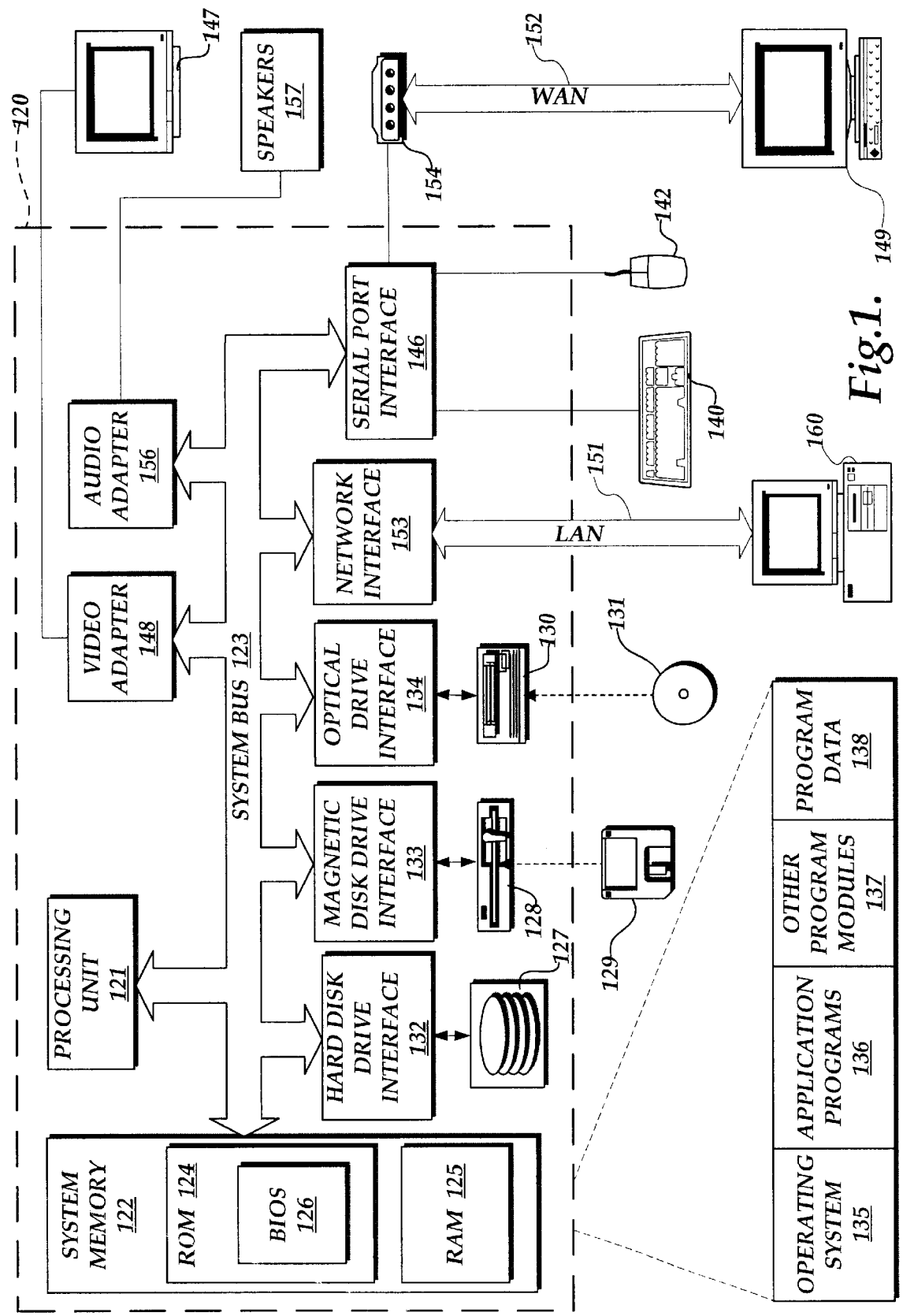
FIG. 1 is block diagram of a general-purpose computer system for implementing the present invention.

The present invention is a method and system for accessing virtual meeting services through an application user interface provided by a functionality of a virtual meeting application. The virtual meeting application provides the basic communication functions required for the virtual meeting while the primary application and virtual meeting application share the responsibility for generating the user interface required to start, administer, and end a virtual meeting. A virtual meeting is conducted between meeting participants including a meeting host and at least one meeting attendee using computers connected over a communication network such as the Internet.

During a virtual meeting, the meeting host and the meeting attendees may communicate with each other via audio, video, transfer of files, drawing on a whiteboard and text. A virtual meeting may also permit the meeting attendees to share a primary application operating on the meeting host's computer, i.e., take control of the primary application running on the meeting host's computer using any of the meeting attendee's computers. For instance, the meeting host and each of the meeting attendees can collaboratively edit an electronic document during the virtual meeting from their own computers using the computer application being shared by the meeting host's computer.

The responsibility for providing the user interface for controlling the virtual meeting application is shared by the primary application and the virtual meeting application. The primary application provides supplementary user interface components for the control of a virtual meeting as part of its user interface, in a manner that is consistent and familiar to a user of that primary application. Using the supplemental user interface, a virtual meeting can be requested from the primary application's user interface while the virtual meeting is actually formed and serviced by a virtual meeting application—without the user even having to be aware of the presence of the virtual meeting application. The virtual meeting application provides dialogs that are displayed as part of the primary application and are in some cases application modal. As used herein, a user interface component is application modal if it is displayed as part of the primary application's user interface and any dialog elements in the user interface component must be answered from within the application user interface. The virtual meeting application generates transient user interfaces that are pertinent to state changes that occur during the virtual meeting that are displayed as part of the primary application's user interface. A virtual meeting application sends event notifications to the primary application upon the occurrence of a state change event. The primary application may use these state change event notifications to create or update supplemental user interfaces provided by the primary application but pertaining to the virtual meeting administered by the virtual meeting application.

Exemplary Computer System and Network

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network Process, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any one of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic. disk 129 and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk drive 127, magnetic disk drive 128, optical disk drive 130, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video interface 148. One or more speakers 157 are also connected to the system bus 123 via an interface, such as an audio interface 156. In addition to the monitor and speakers, personal computers typically include other peripheral output devices (not shown), such as printers.

The personal computer 120 may operate in a networked environment using logical connections to one or more remote computers, such as remote computers 149 and 160. Each remote computer 149 or 160 may be another personal computer, a server, a router, a network PC, a peer device or other common network node, and typically includes many or all of the elements described above relative to the personal computer 120. The logical connections depicted in FIG. 1 include a local area network (LAN) 151 and a wide area network (WAN) 152. Such networking environments are commonplace in offices, enterprise-wide computer networks, intranets and the Internet. As depicted in FIG. 1, the remote computer 160 communicates with the personal computer 120 via the local area network 151. The remote computer 149 communicates with the personal computer 120 via the wide area network 152.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System Architecture

Figure 2:
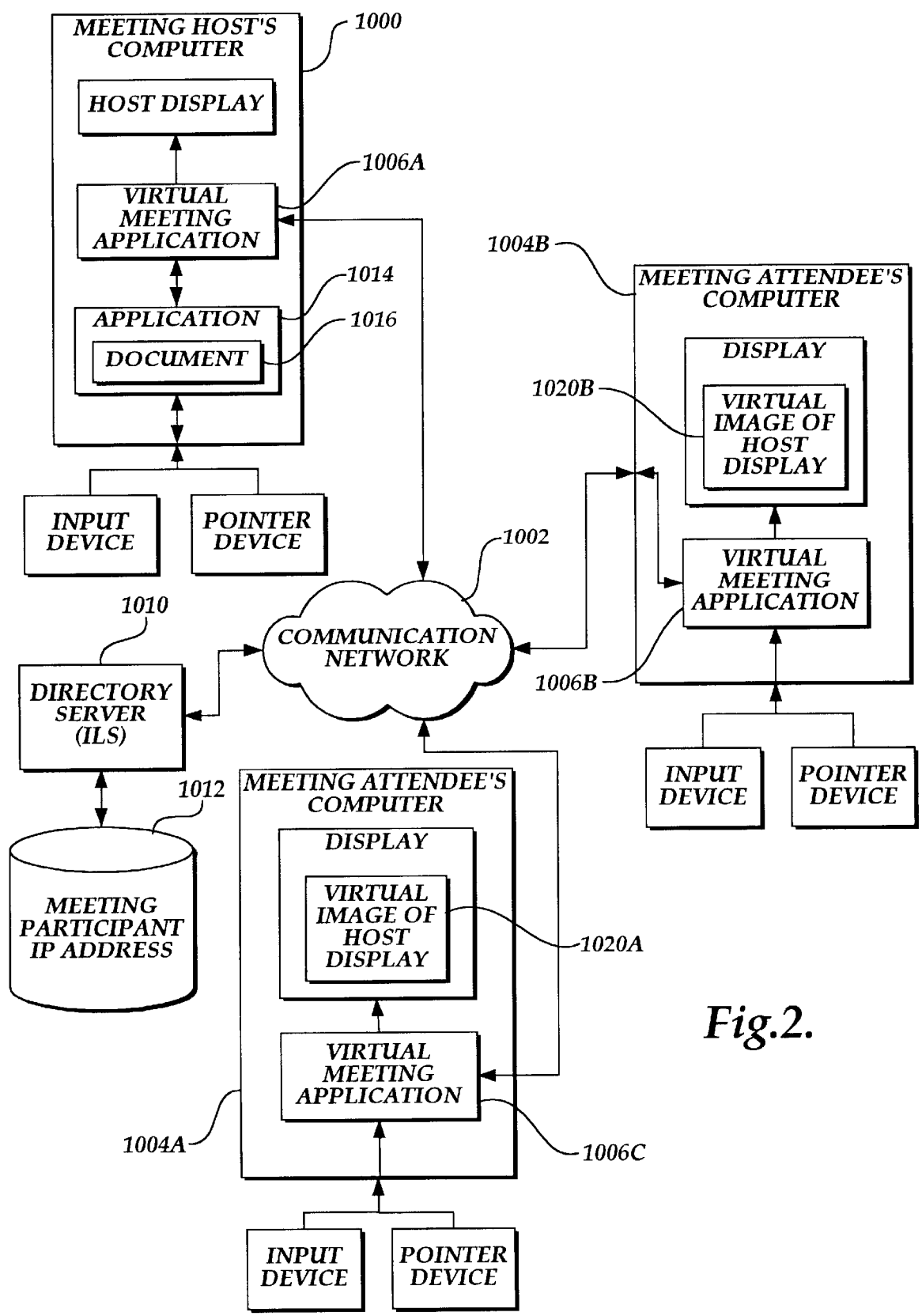
FIG. 2 is a block diagram illustrating the primary hardware and software components utilized by the present invention to connect, monitor and administer a virtual meeting with electronic document collaboration capabilities in real time.

As illustrated in FIG. 2, a virtual meeting involves a meeting host's computer 1000 communicating through a communication network 1002 with one or more meeting attendee's computers 1004A–B. The meeting participant's computers 1000 and 1004A–B may include the personal computer 120 described with reference to FIG. 1, or may be equivalent devices such as workstations, laptop computers, notebook computers, palmtop computers, personal digital assistance (PDAs), cellular telephones and alphanumeric pagers. The communications network 1002 may comprise a local area network (LAN) 151, a wide area network (WAN) 152, a telephone line and modem 154, a cable, or any other bi-directional communication means known to those skilled in the art.

During a virtual meeting, the communication functions are administered by a virtual meeting application 1006A–C, a copy of which is loaded on the meeting host's computer 1000 and on each of the meeting attendee's computers 1004A–B. In an actual embodiment of the invention, the virtual meeting application 1006A–C is Microsoft NetMeeting, manufactured by Microsoft Corporation, Redmond, Wash. Microsoft NetMeeting is compliant with the International Telecommunications Union Teleconferencing Standard T.120. The T.120 defines a standard for the multipoint delivery of teleconferencing data to multiple parties in real time. The technical details of the T.120 standard can be obtained from the International Telecommunications Union in Geneva, Switzerland, or through the ITU web page at http://www.itu.ch. Other telecommunications protocols may be used as developed or improved.

The virtual meeting application utilizes a directory server 1010 that is accessible through the communication network 1002. The directory server 1010 is also known as an Internet location server (ILS). The directory server 1010 is coupled to a database 1012 that contains a list of IP addresses including the meeting host's computer 1000 and each of the meeting attendee's computers 1004A–B. The IP address is associated with an email address for the meeting participant (host or attendee) that uses the meeting host's computer 1000 and for each of the meeting attendee's computers 1004A–B.

The meeting host's computer 1000 also has one or more document editing applications 1014. Each document editing application 1014 may access and edit one or more electronic documents 1016. For use in the present invention, the document editing application 1014 must interface with the virtual meeting application 1006A, so that the electronic document 1016 may be collaboratively edited, i.e., allowing all meeting participants to use the functionality of the document editing application 1014 through the interconnection of the meeting host's computer 1000 and each of the meeting attendee's computers 1004A–B during a virtual meeting. A document editing application 1014 is included in the more general discussion of primary applications described below.

System Operation

FIG. 3 is a pictorial representation of an application user interface 1110 provided by an actual embodiment of the invention in Microsoft Word 2000 manufactured by Microsoft Corporation of Redmond, Wash. The application user interface 1110 includes a document editing area 1112 and user interface elements such as toolbars 1114 and menus 1116. Selection of a menu item in the Tools menu 1118 results in the display of a drop-down menu 1120 that includes a menu item for Online Collaboration 1122. Selection of the Online Collaboration menu item 1122 results in the display of a submenu 1124 that includes menu items: Meet Now 1126, Schedule Meeting 1128, and Web Discussions 1130. Selection of the Meet Now menu item 1126 initiates the process for forming and administering a virtual meeting as illustrated in FIGS. 4A–D.

The interaction between a primary application and a virtual meeting application to establish a virtual meeting is illustrated in the twin flow charts of FIGS. 4A–D. The method begins in the primary application (illustrated on the left side of FIGS. 4A–4D) when a request is received 1210 from the primary application's user interface (AUI) requesting an Online Collaboration 1122 to Meet Now 1126 (FIG. 3). In response to the selection of the Meet Now menu item 1126, the primary application invokes 1212 a virtual meeting application through an application interface exposed by the virtual meeting application in a global name space. In an actual embodiment of the invention, the application interface conforms to the Microsoft COM interface specification available from Microsoft Corporation, Redmond, Wash. Each object conforming to the Microsoft COM specification must expose an IUnknown interface. By definition, the IUnknown interface has a QueryInterface function that when called returns whether an object supports a particular interface. By accessing the IUnknown interface and calling the QueryInterface function, the primary application can receive a pointer to a particular application interface that will best serve the needs of the primary application. The application interface may be associated with a predefined mode that specifies the components of the virtual meeting application's user interface ("VMUI") that will be suppressed or displayed during a virtual meeting initiated through the application interface. When the primary application invokes the application interface, the virtual meeting application starts 1214 an instance of a virtual meeting and displays (as needed) those components of the virtual meeting application's user interface that are specified by the predefined mode associated with the application interface. Instead of associating a predefined mode with a particular application interface, it is possible to pass an identification of the predefined mode to a general application interface as a parameter to the function call.

The virtual meeting application generates 1216 a Place a Call dialog that is displayed 1218 as part of the primary applications user interface. In an actual embodiment of the invention, the Place a Call dialog 1410 (FIG. 6) is displayed as part of the primary application's user interface in a manner that appears to the user that the Place a Call dialog 1410 is part of the primary application. To further the impression that the Place a Call dialog is part of the primary application user interface, it is preferable to make the Place a Call dialog 1410 application modal to the primary application. Since the Place a Call dialog must be responded to before continuing in the primary application, this restricts the user from separating the Place a Call dialog from the primary application.

Figure 6:
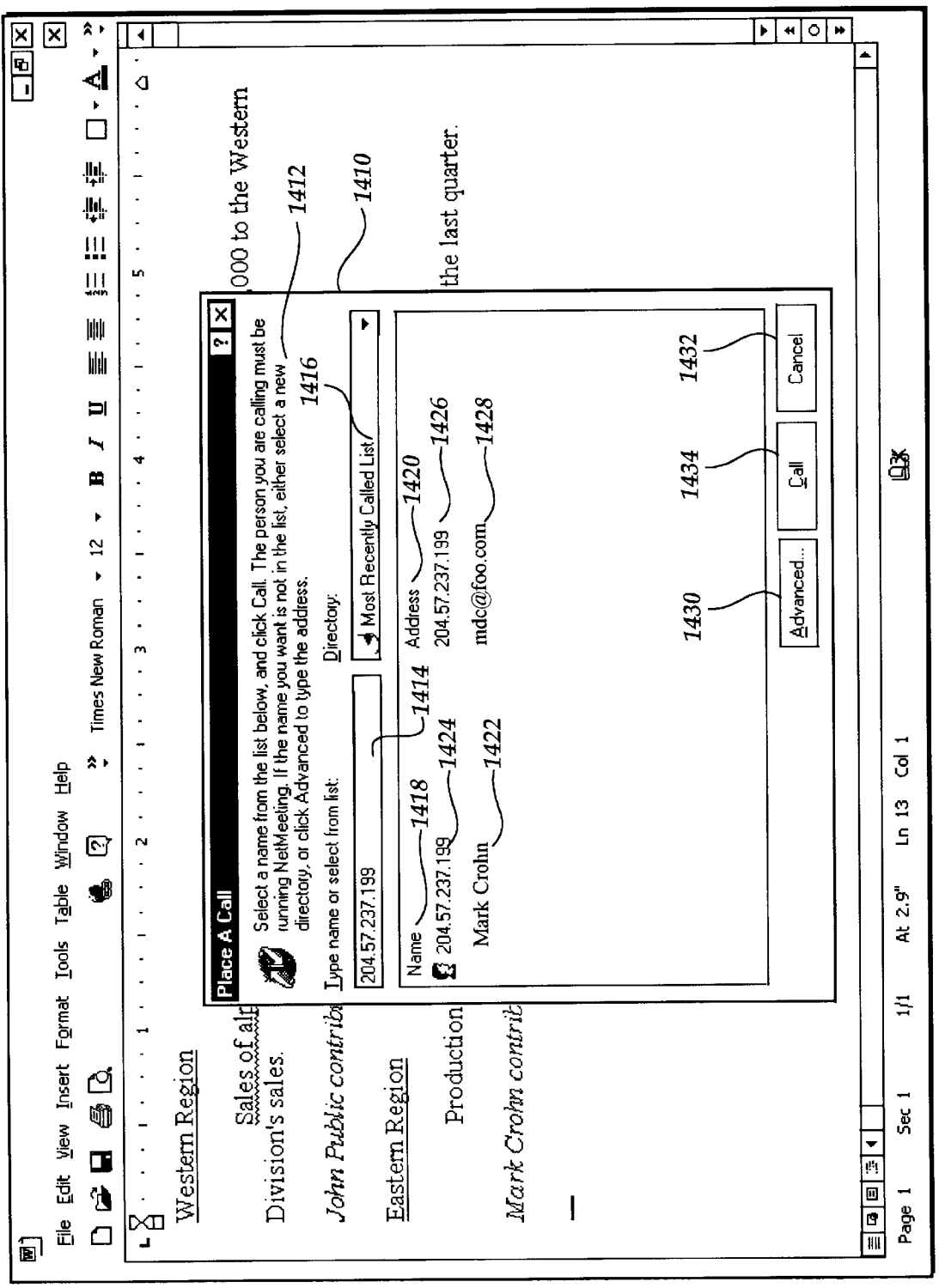
FIG. 6 is a pictorial representation of a Place a Call dialog generated by the virtual meeting application and displayed application modal in an exemplary primary application.

In FIG. 6, the Place a Call dialog 1410 is generated by the virtual meeting application but displayed in the primary application's user interface 1110. The Place a Call dialog 1410 includes an instruction area 1412, a name selection text box 1414 and a directory list box 1416. As illustrated in FIG. 6, the directory list box includes a most recently called list that includes the name 1418 and the address 1420 of potential meeting attendees. The name of the meeting attendee may be an actual name 1422, an Internet protocol (IP) address 1424, a machine name or other alias. The address may be specified as an IP address 1426 or an e-mail address 1428. Selecting an Advanced command button 1430 will display an advanced window that allows the direct entry of an IP address that specifies the network location of a meeting attendee's computer. This may be helpful in circumstances such as when the meeting attendees are on a computer network that is protected by a firewall, which hides the internal network addresses of attached computers from the remainder of the network connected to an external side of the firewall. Selecting the Cancel button 1432 removes the Place a Call dialog 1410 from the primary application's user interface, while selecting the Call command button 1434 initiates the process of forming the virtual meeting.

Returning to FIG. 4A, if the Cancel button 1432 (FIG. 6) has been activated, a decision 1219 passes control to a block 1240 (FIG. 4B) that displays a supplemental user interface, discussed below. Otherwise, a decision 1219 if a valid name is entered in the name text box 1414 and the Call button 1434 is activated, the virtual meeting application initiates 1220 a call to the meeting participant listed in the name box 1414 (FIG. 6) at the corresponding address 1420. The virtual meeting application monitors the call progress and generates 1222 a call progress message box that is displayed 1224 on the meeting host's video display on top of all applications. Normally, this means that the call progress dialog would be displayed on top of the primary application, but the user may choose while waiting for the call to actually be connected to minimize the primary application and utilize another application.

Figure 4A:
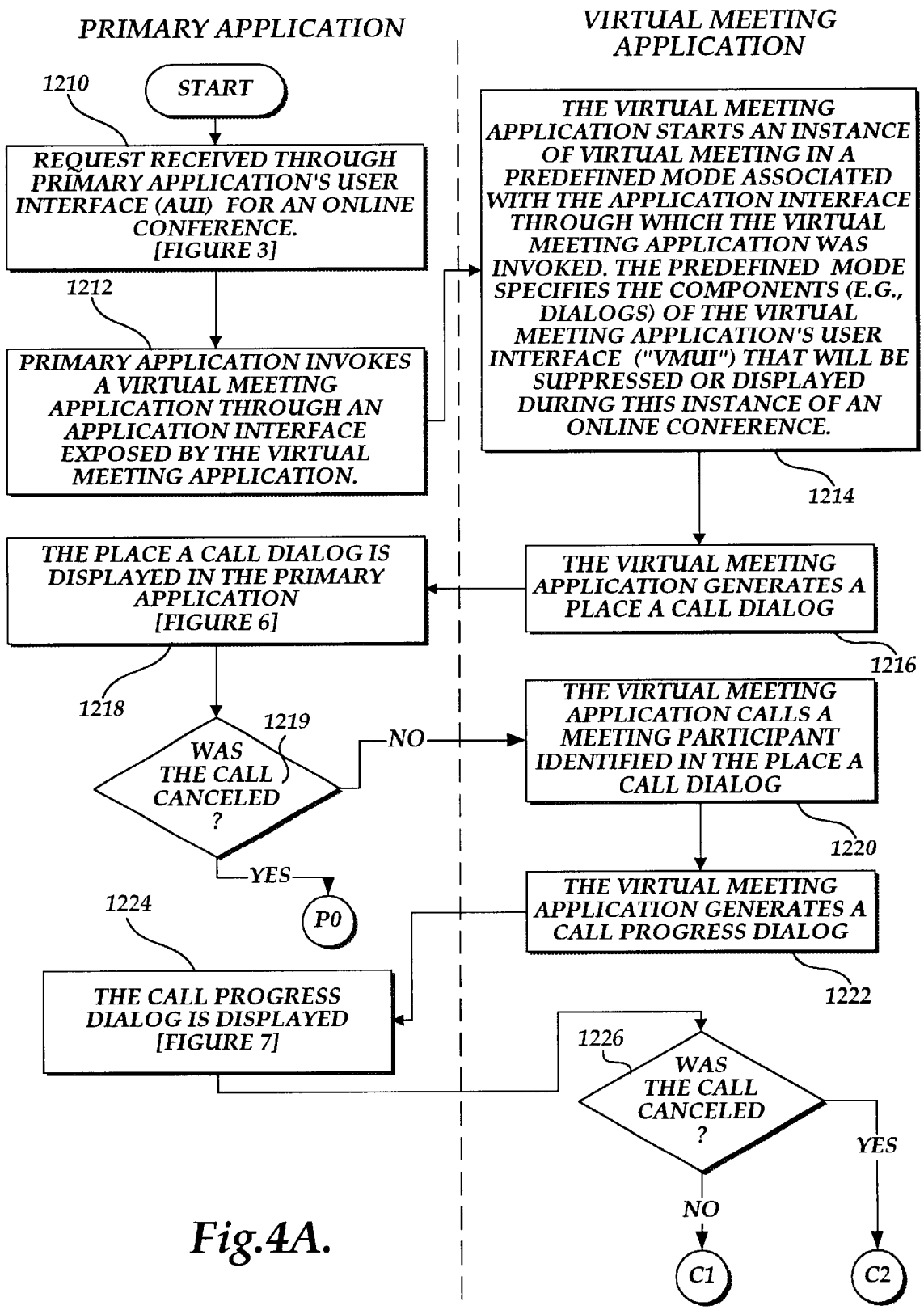
FIGS. 4A–D illustrates with a pair of functional flow diagrams the method of interaction and assignment of responsibilities between the primary application and the virtual meeting application, in accordance with the present invention.
Figure 4B:
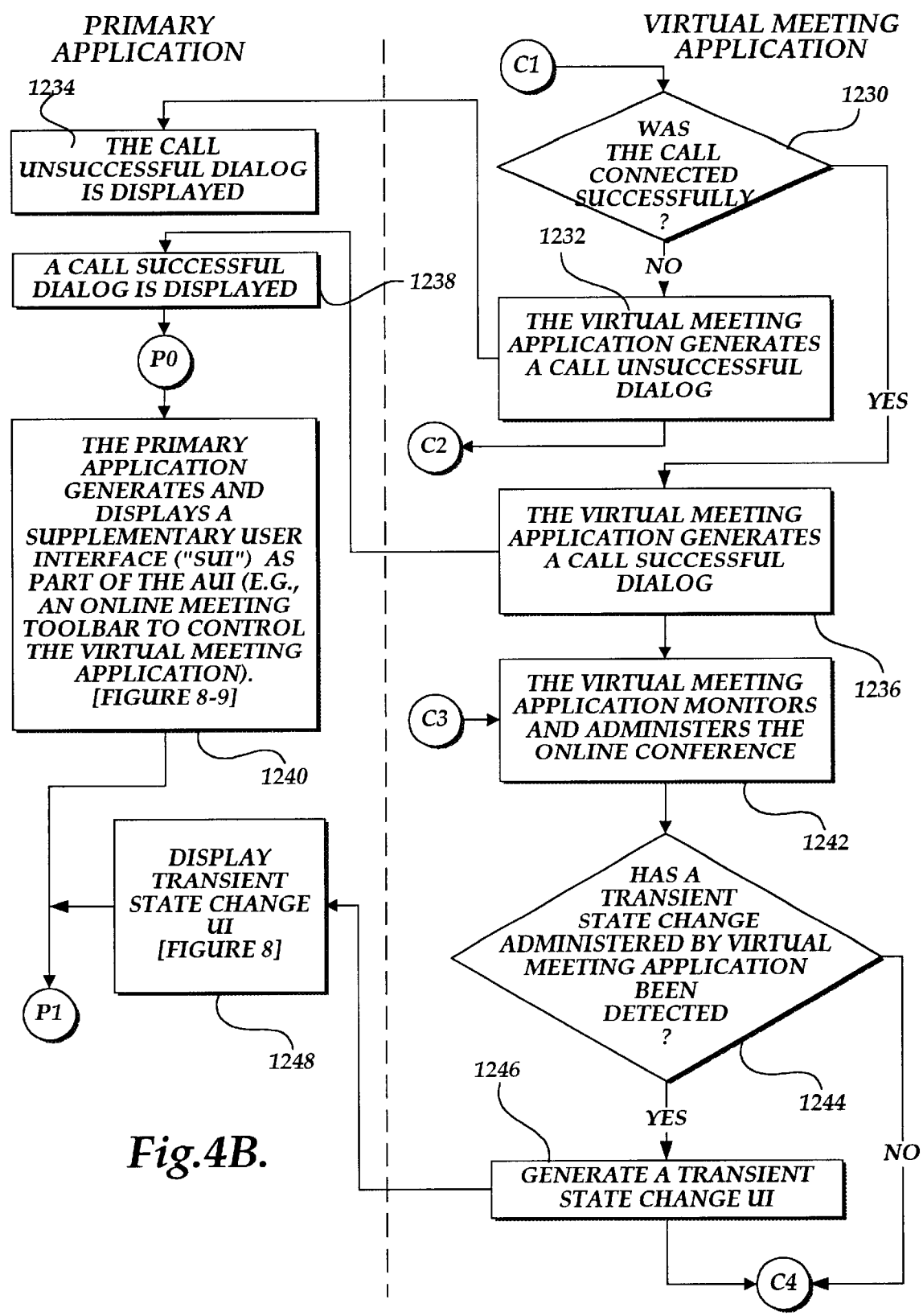
Figure 7:
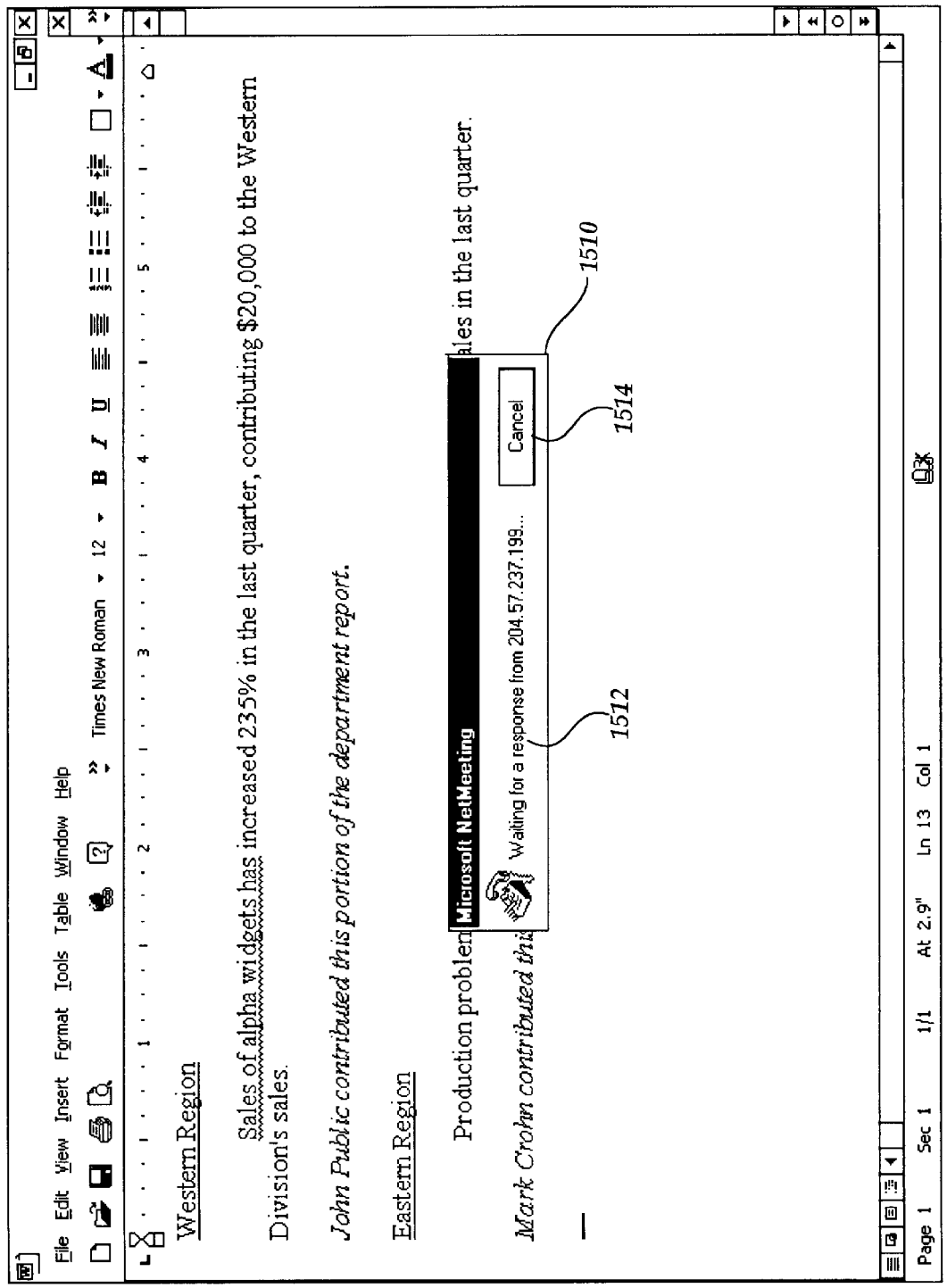
FIG. 7 is a pictorial representation of an exemplary transient user interface generated and displayed by the virtual meeting application to inform a user of the current status of the virtual meeting application's attempt to form a virtual meeting with a meeting attendee, in accordance with the present invention.

A call progress dialog 1510 is illustrated as it would appear on top of the primary applications user interface in FIG. 7. A message 1512 in the call progress dialog box displays transient state information currently monitored by the virtual meeting application. Activating a Cancel command button 1514 is detected in a decision 1226 (FIG. 4A) which then sends 1228 (FIG. 4C) a state change event notification that the call has been canceled to the primary application. The processing of the state change event notifications will be discussed in detail below. Turning to FIG. 4B, if the call was not canceled, the virtual meeting application determines 1230 if the call was connected successfully. A successfully connected call means that communication was established with a meeting attendee that agreed to join the virtual meeting. If the call was not connected successfully, the virtual meeting application generates 1232 a call unsuccessful dialog which is displayed 1234 on top of the primary application. The virtual meeting utility also detects that a call unsuccessful state change occurred and sends 1228 (FIG. 4C) a state change event notification to the primary application. If the call was completed successfully, as determined by decision 1230, the virtual meeting application generates 1236 (FIG. 4B) a call successful dialog that is displayed 1238 on top of the primary application's user interface.

Figure 8:
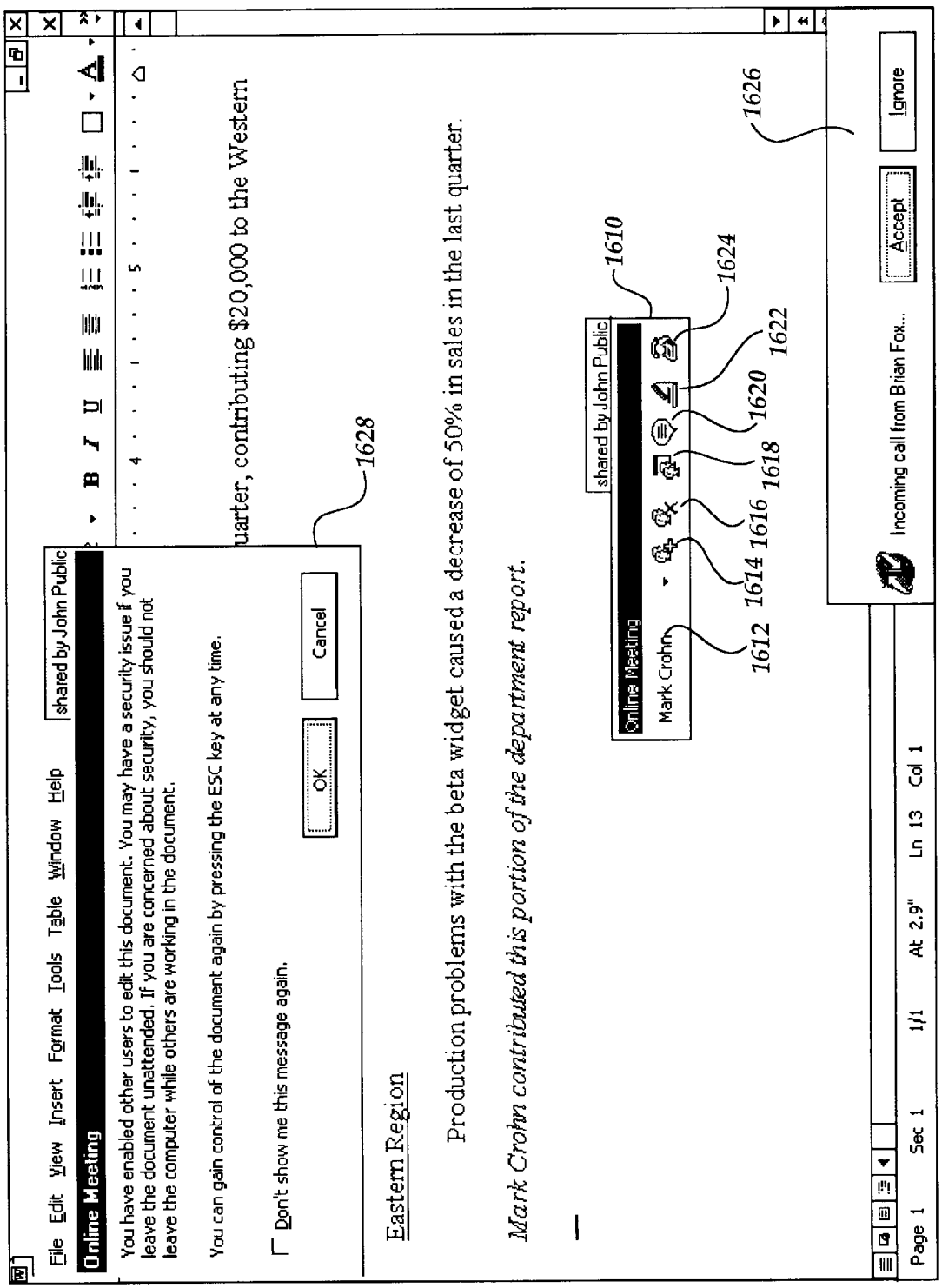
FIG. 8 is a pictorial representation of an exemplary transient user interface generated and displayed by the virtual meeting application to inform and receive responses from a user, in accordance with the present invention.

The primary application generates and displays a supplementary user interface (SUI) for the control of a virtual meeting as part of the primary applications user interface. For example, in an actual embodiment of the invention the primary application displays an online meeting toolbar through which a user both receives information and can send instructions to the virtual meeting application to affect the state of the virtual meeting. The online meeting toolbar is illustrated in FIGS. 8 and 9, discussed below.

The virtual meeting application begins a processing loop which monitors, administers, and provides 1242 the functionality/communication services for the virtual meeting. During this process loop, the virtual meeting application determines 1244 when a transient state change has been detected. If the predefined mode specifies that the detected transient state change is administered by the virtual meeting application, the virtual meeting application generates 1246 a transient state change user interface which is then displayed 1248 on top of the primary application (e.g., 1626; FIG. 8).

Figure 4C:
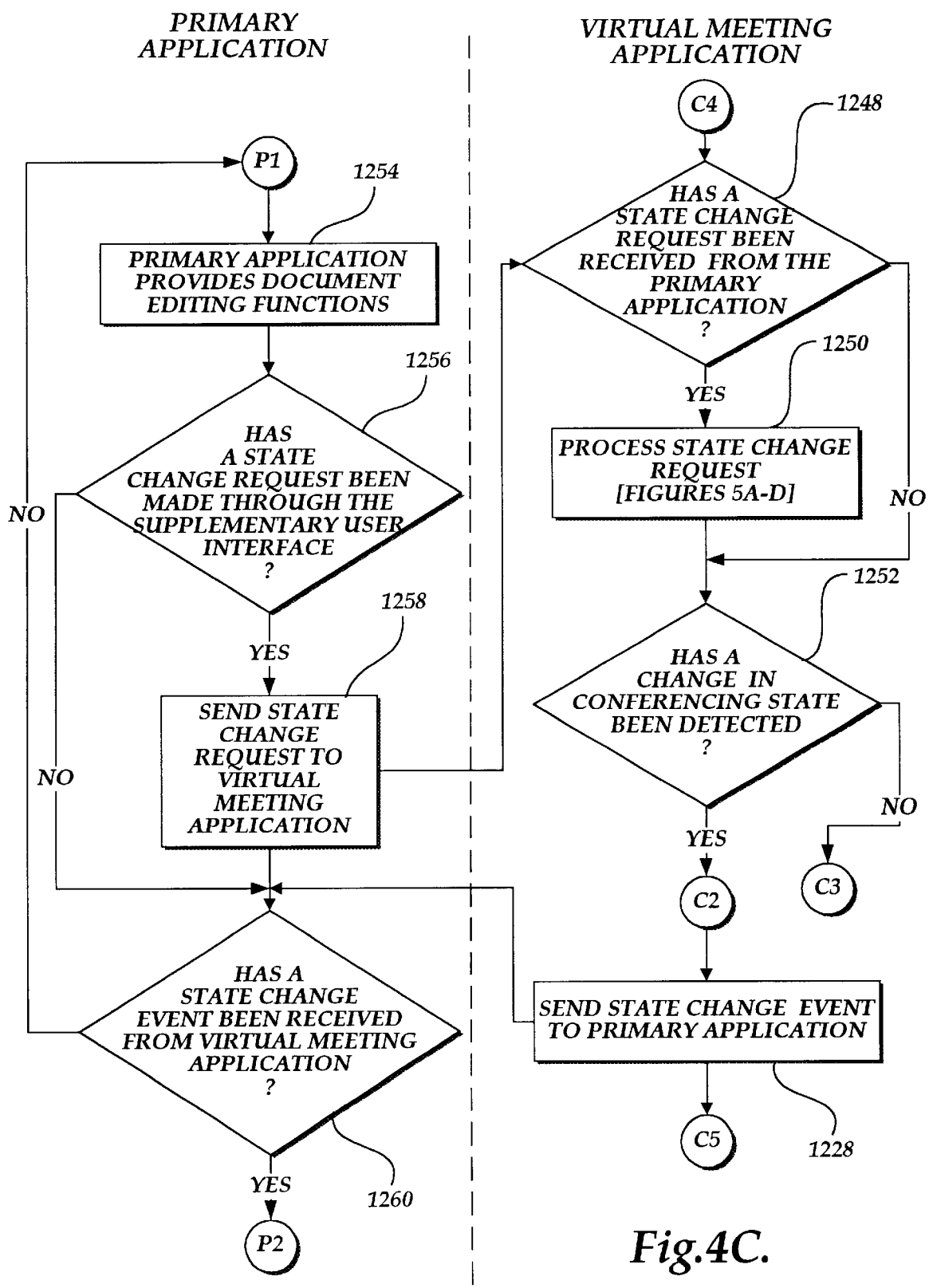
Figure 4D:
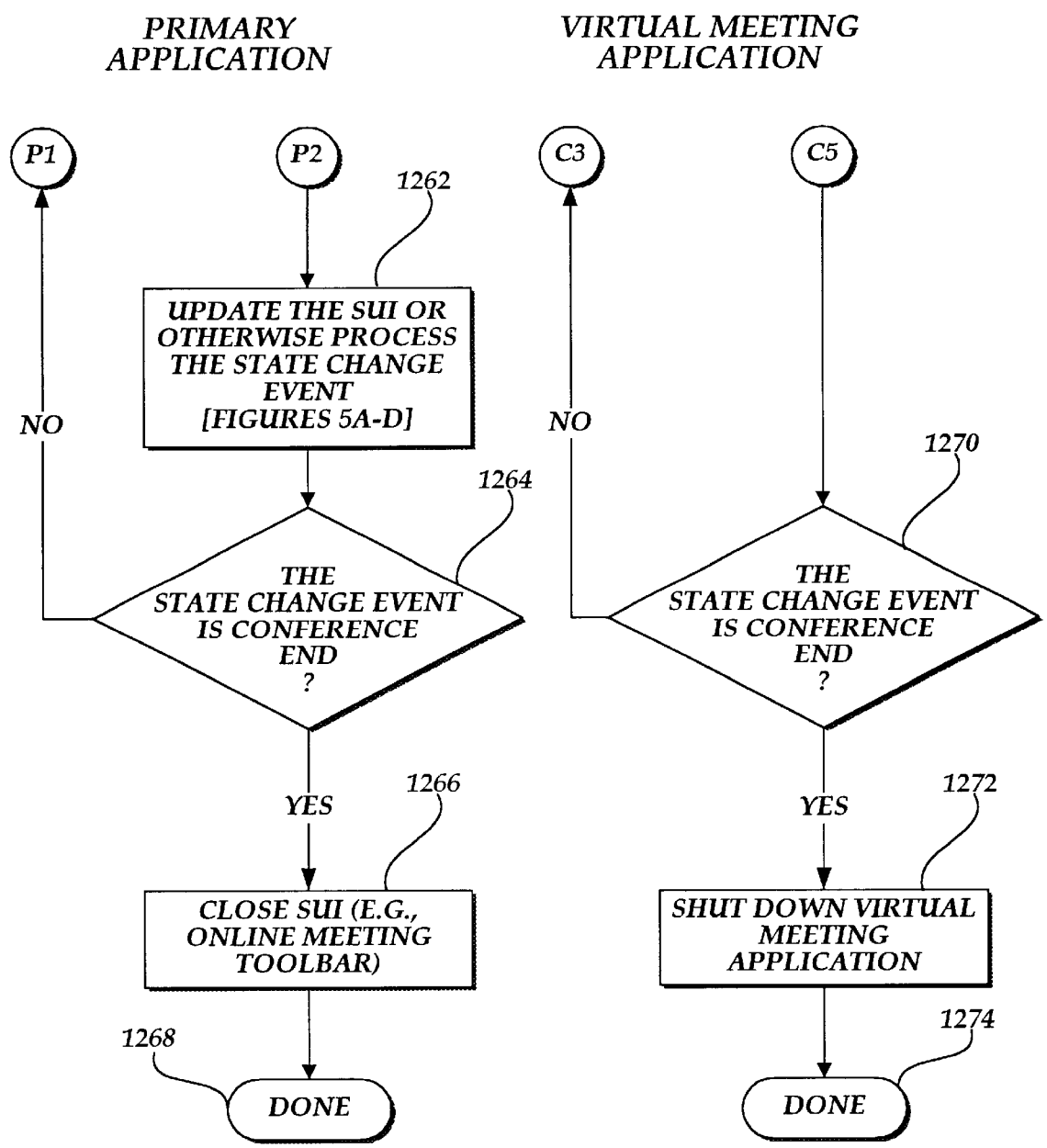

If the decision 1244 detects a transient state change that is not to be administered by the virtual meeting application according to the predetermined mode, or following the generation of the transient state change user interface 1246 (FIG. 4B), the virtual meeting application continues the processing loop in FIG. 4C by detecting 1248 if a state change request has been received from the primary application. The state change request is processed 1250, if received, as illustrated in FIGS. 5A–D, which is discussed below. If a state change request has not been received by the virtual meeting application, the processing loop continues by checking if a state change event has been detected 1252. If a state change event has been detected 1252, a state change event notification is sent 1228 to the primary application. If there is no change in conference state detected 1252, the processing loop returns to monitoring and administering 1242 (FIG. 4B) the virtual meeting. It will be appreciated by one skilled in the art that the functional flow diagrams illustrated in FIGS. 4A–D and 5A–D are provided for convenience of description only and that the detection of state change requests or changes of state in the virtual meeting may be detected asynchronously as the event occurs and a state change notification may be sent immediately to any application concerned with the state change.

Returning to FIG. 4C, as the virtual meeting application is monitoring and administering the virtual meeting, the primary application also enters into a main processing loop where the primary application provides 1254 its functionality such as the document editing functions of Microsoft Word. The primary application detects if a state change request has been made through the supplementary user interface, which in FIGS. 8 and 9 is illustrated in an actual embodiment of the invention as an online meeting toolbar 1610 that includes a drop-down list box 1612 containing the names of the meeting attendees currently in the meeting. The online meeting toolbar 1610 also includes an add meeting attendee command button 1614; a remove meeting attendee command button 1616; a document collaboration toggle command button 1618; a chat window command button 1620; a white board command button 1622; and a hang up command button 1624. The specific state changes requested by command buttons 1614–1624 are discussed below with reference to FIGS. 5A–D.

In FIG. 4C, if a state change request has been made through the supplementary user interface 1610 as determined in decision 1256, a state change request is sent 1258 to the virtual meeting application where it is processed as discussed above. If no state change request has been detected by decision 1256 the primary application determines 1260 if a state change event notification has been received from the virtual meeting application. If no state change event notification has been received, the primary application loops to continuing to provide 1254 the document editing functions for which it is being used.

If a state change event has been received from the virtual meeting application, as determined in decision 1260, the information contained in the state change event notification is used 1262 (FIG. 4D) by the primary application to update the supplementary user interface, to otherwise process the state change event, or the state change event notification may be ignored altogether. For instance, in an actual embodiment in the invention a state change notification may contain information that a meeting attendee has joined the virtual meeting. This information is used to update the name drop-down list box 1612 with the name of the meeting attendee that has joined the meeting.

A decision 1264 determines if the state change event notification contains information that the conference has ended. If so, the supplemental user interface is closed 1266 in the primary application and the method is done 1268. If the state change event notification does not contain information that the conference has ended as determined in decision 1264, the primary application loops to continue to provide 1254 the document editing functions (FIG. 4C). Similarly, a state change event detected by decision 1252 in the virtual meeting application may be a conference end. After the state change event notification is sent 1228 to the primary application, the virtual meeting application checks 1270 if the state change event was that the conference has ended. If the decision 1270 determines that the conference has ended, the virtual meeting application is shut down 1272 (assuming that no other application is also using the virtual meeting application). The method in the virtual meeting application is then done 1274.

Exemplary state change requests (sent in block of 1258 FIG. 4C) by the primary application are illustrated in FIGS. 5A–D. The state change requests illustrated in FIGS. 5A–D correspond to the state change request command buttons 1614–1624 illustrated in the online meeting toolbar 1610 in FIG. 8. State change requests may be deleted or added as required and remain within the scope and spirit of the present invention. When the add meeting attendee command button 1614 is activated, it is detected in a decision 1410 which sends the state change request (block 1258; FIG. 4C) to the virtual meeting application. The virtual meeting application adds 1412 a meeting attendee to the conference and returns the state information to the primary application.

The virtual meeting application generates 1418 (in accordance with the predefined mode) a meeting attendee added pop-up window similar to transient dialog window 1626 in FIG. 8 is generated 1418 and is displayed 1420 on top of the primary application. The state change information sent in block 1228 (FIG. 4C) by the virtual meeting application is used to update 1422 the supplemental user interface with the user information contained in the state change event. This is accomplished in an actual embodiment of the invention by adding the name of the meeting attendee to the meeting attendee list box 1612 (FIG. 8) in the online meeting toolbar 1610. The method then continues to check for state change requests.

If the state change request is to remove a meeting attendee, a decision 1424 directs the virtual meeting application to remove 1426 a specified meeting attendee from the virtual meeting and to return state information as to the success of that action. Like above, the virtual meetings user interface is suppressed 1428 in favor of generating and sending 1430 the state change information in a state change event notification to the primary application that the meeting attendee has been removed. Assuming that the meeting attendee was successfully removed, the virtual meeting application generates 1432 a meeting attendee removed pop-up window that is displayed 1434 on top of the primary application (again similar to the transient user interface 1626 illustrated in FIG. 8). The supplemental user interface is then updated 1436 with the state change information contained in the state change event notification, which in this case would be to remove the name of the meeting participant from the name list box 1612 (FIG. 8) of the online meeting toolbar 1610. The method then continues to check for state change requests.

Figure 5A:
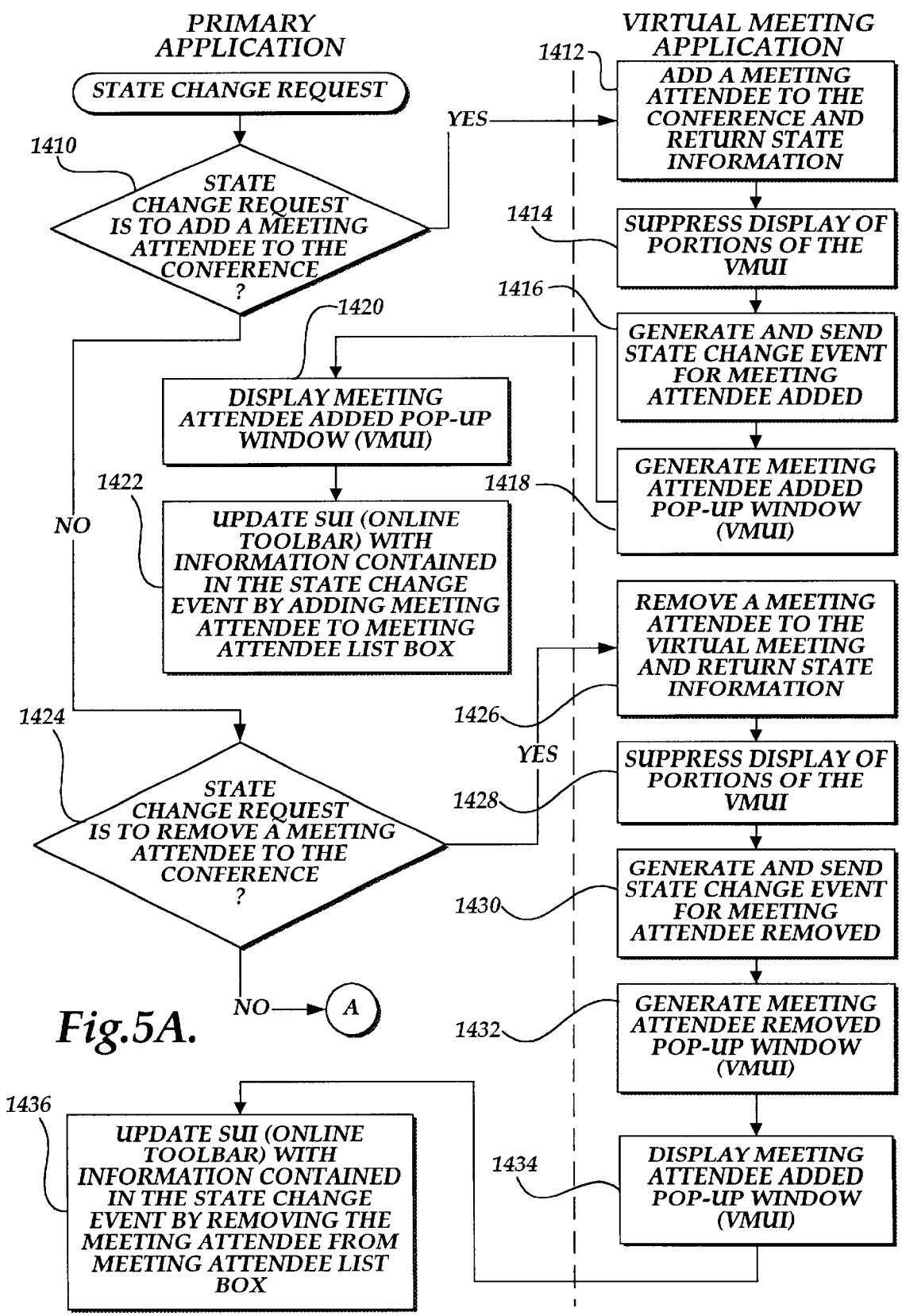
FIGS. 5A–D illustrates with a pair of functional flow diagrams the processing of exemplary state change requests, in accordance with the present invention.
Figure 5B:
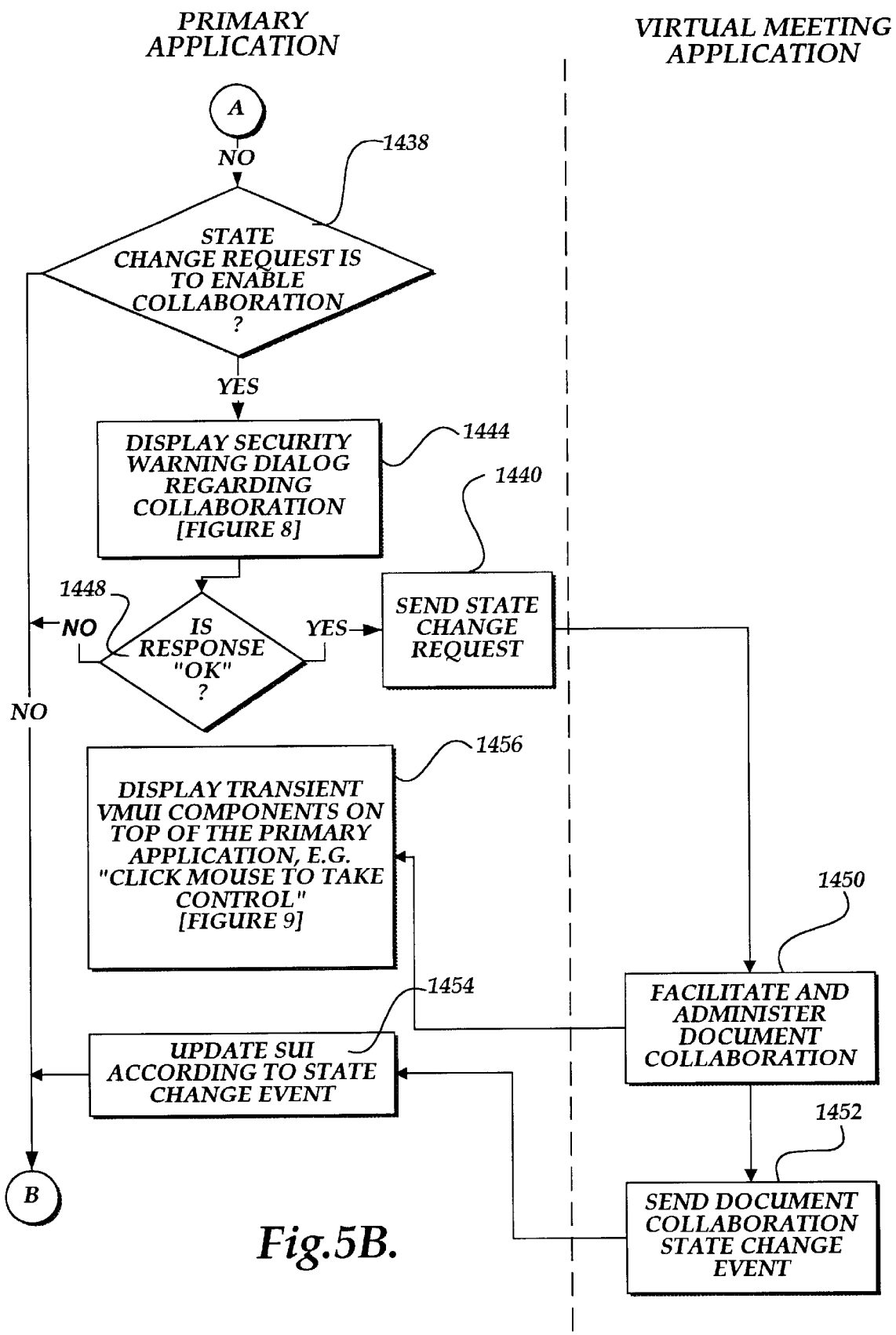

If the state change request is to enable collaboration with other meeting attendees, this is detected in a decision 1438 (FIG. 5B). In an actual embodiment of the invention, a security warning dialog is generated by the primary application that warns a user that document collaboration potentially exposes the meeting host's computer to the possibility of unauthorized use by a meeting attendee. An exemplary security warning dialog 1628 is illustrated in FIG. 8. The primary application then sends 1440 the state change request to the virtual meeting application.

Figure 5C:
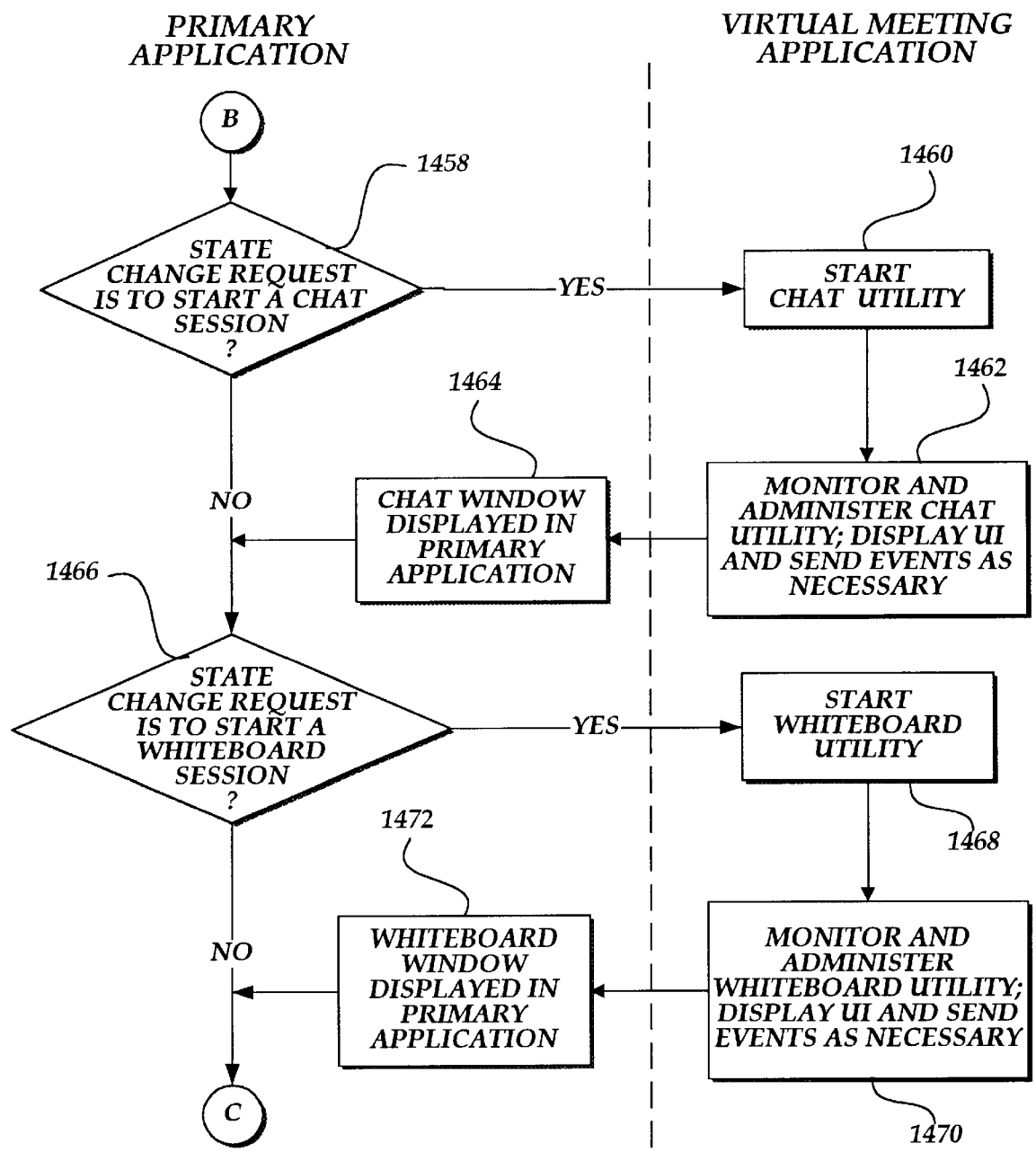
Figure 5D:
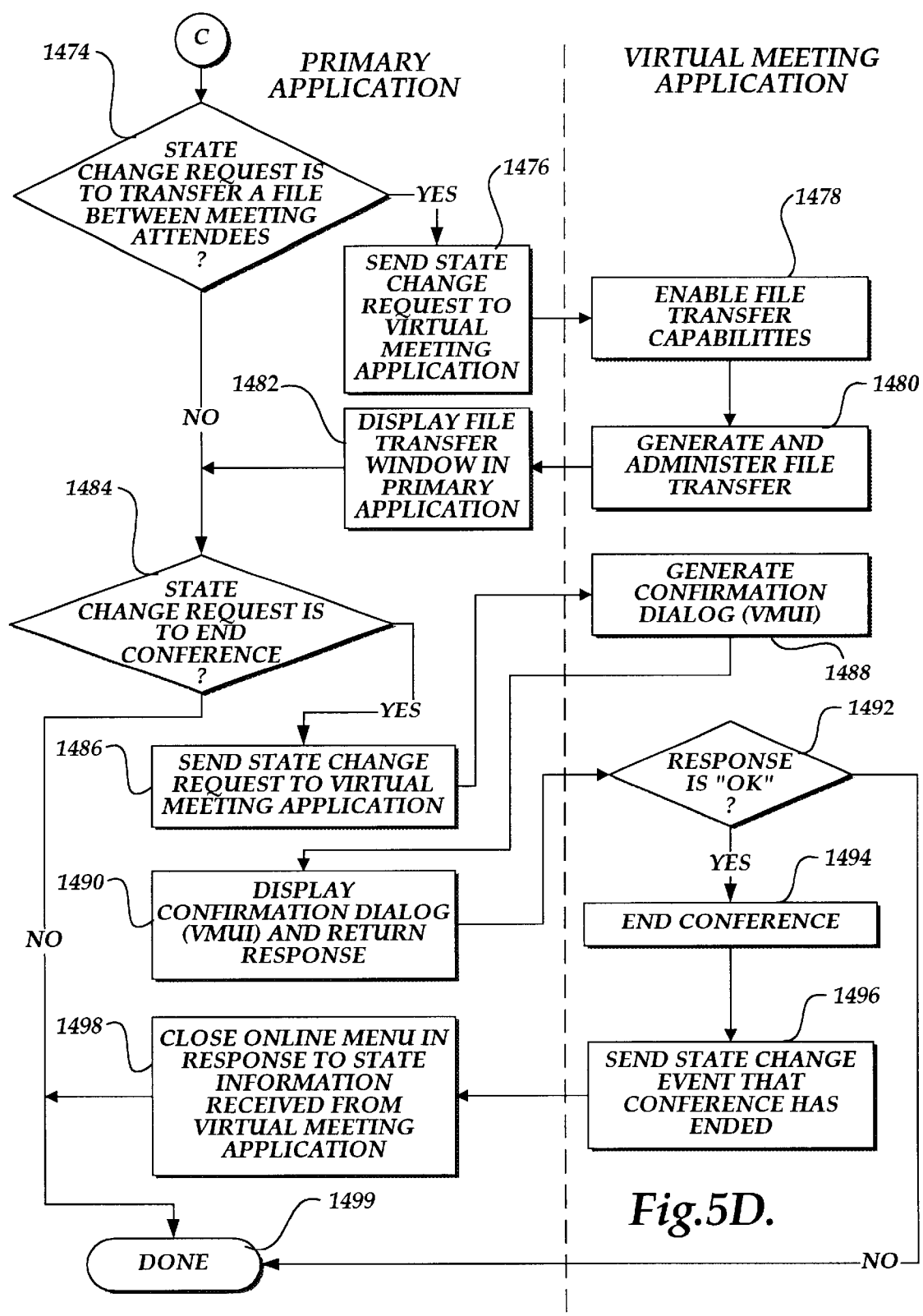

Returning to FIG. 5B, the security warning dialog is displayed 1444 in the primary application where a response is required to continue. If the response is to okay the security warning, a decision 1448 passes control to a block 1440 that sends a state change request to the virtual meeting application. The virtual meeting application then facilitates and administers 1450 the document collaboration. A state change event including this information is sent 1452 in a state change notification to the primary application where the information that document collaboration has been enabled is used to update the supplemental user interface to indicate that document collaboration is enabled. If the response to the security warning dialog is to cancel, control is passed to decision 1458 (FIG. 5C).

Figure 10:
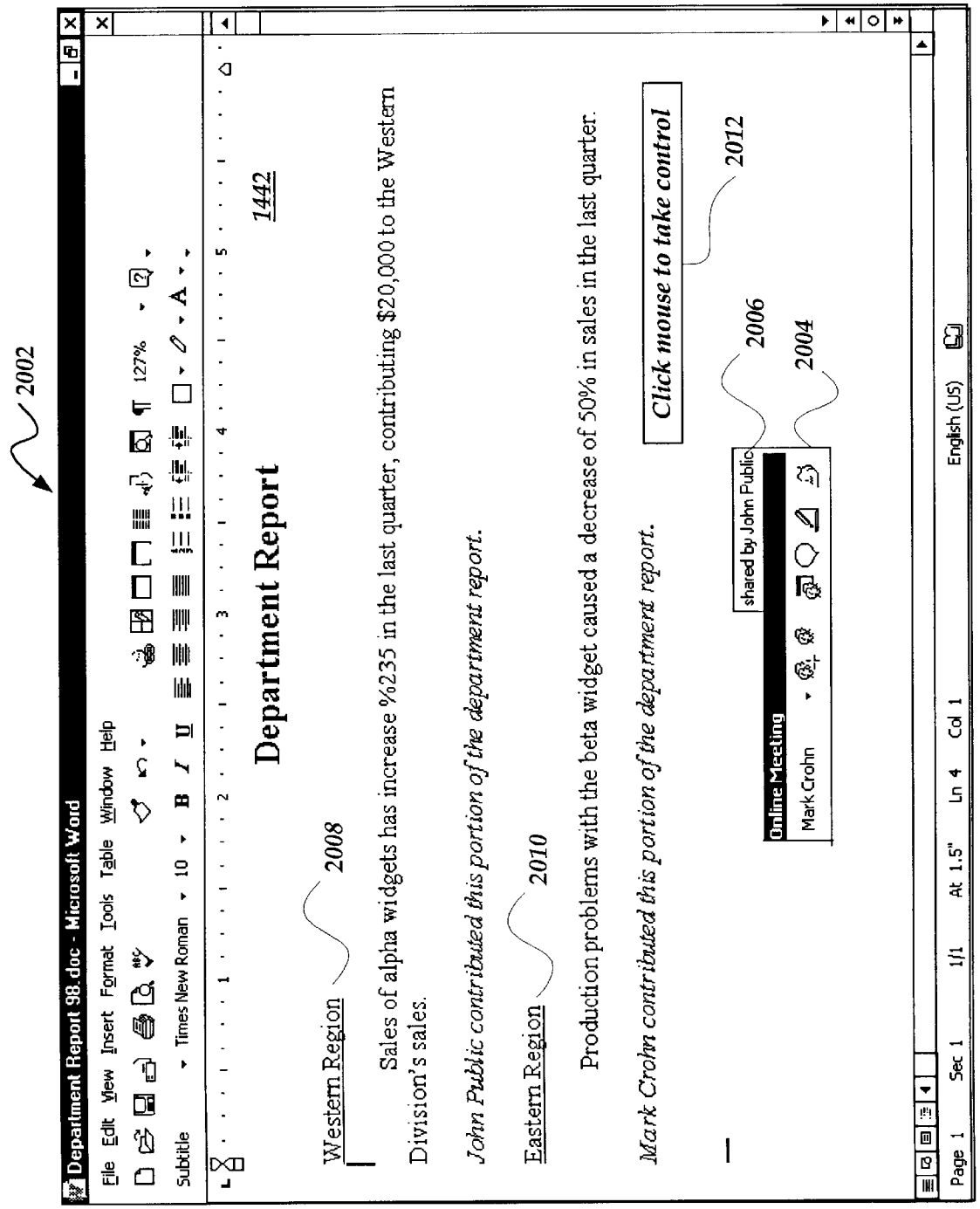
FIG. 10 is a pictorial representation of a primary application's user interface that includes a supplementary user interface though which a user controls a virtual meeting application that furnishes the functionality for a virtual meeting and online collaboration.

While facilitating and administering 1450 the document collaboration, the virtual meeting application is responsible for displaying 1456 transient virtual meeting utility interface components such as the "Click Mouse To Take Control" window 2012 shown in FIG. 10. The Click Mouse To Take Control window 2012 is displayed on top of the primary application 1014 (FIG. 2) when the meeting host moves the mouse indicating that the meeting host wishes to take control of the document collaboration. If a meeting attendee moves the mouse on the meeting attendee's computer, the Click Mouse To Take Control window 2012 is displayed above the virtual image of the host display 1020A–B appearing on the meeting attendee's computer 1004A–B. Of course, other transient virtual meeting user interface components may be generated as is required to facilitate the document collaboration or the virtual meeting in general.

Returning to FIG. 5C, if the state change request is to start a chat session, a decision 1458 directs the virtual meeting application to start 1460 a chat utility application. A chat utility application allows the participants in a virtual meeting to exchange text messages outside of the primary application. An example of a chat utility application may be found in Microsoft NetMeeting, available from Microsoft Corporation, Redmond, Wash. The virtual meeting application may monitor and administer 1462 the chat utility application, display transient user interfaces in response to state change events in the chat utility, and forward state change event notifications to the primary application, as is necessary. The user interface associated with the chat window is displayed 1464 on top of the primary application. Similarly, if the state change request is to start a whiteboard session, a decision 1466 directs the virtual meeting application to start 1468 a whiteboard utility application. A whiteboard utility application allows the meeting participants to interact using graphics drawn on a whiteboard user interface that is displayed on all the meeting participants' computers 1000 and 1004A–B. The virtual meeting application may monitor and administer the whiteboard utility application and display user interfaces in response to state change events, as well as sending 1470 state change event notifications to the primary application as is necessary. The whiteboard window is displayed 1472 in the primary application.

Figure 9A:
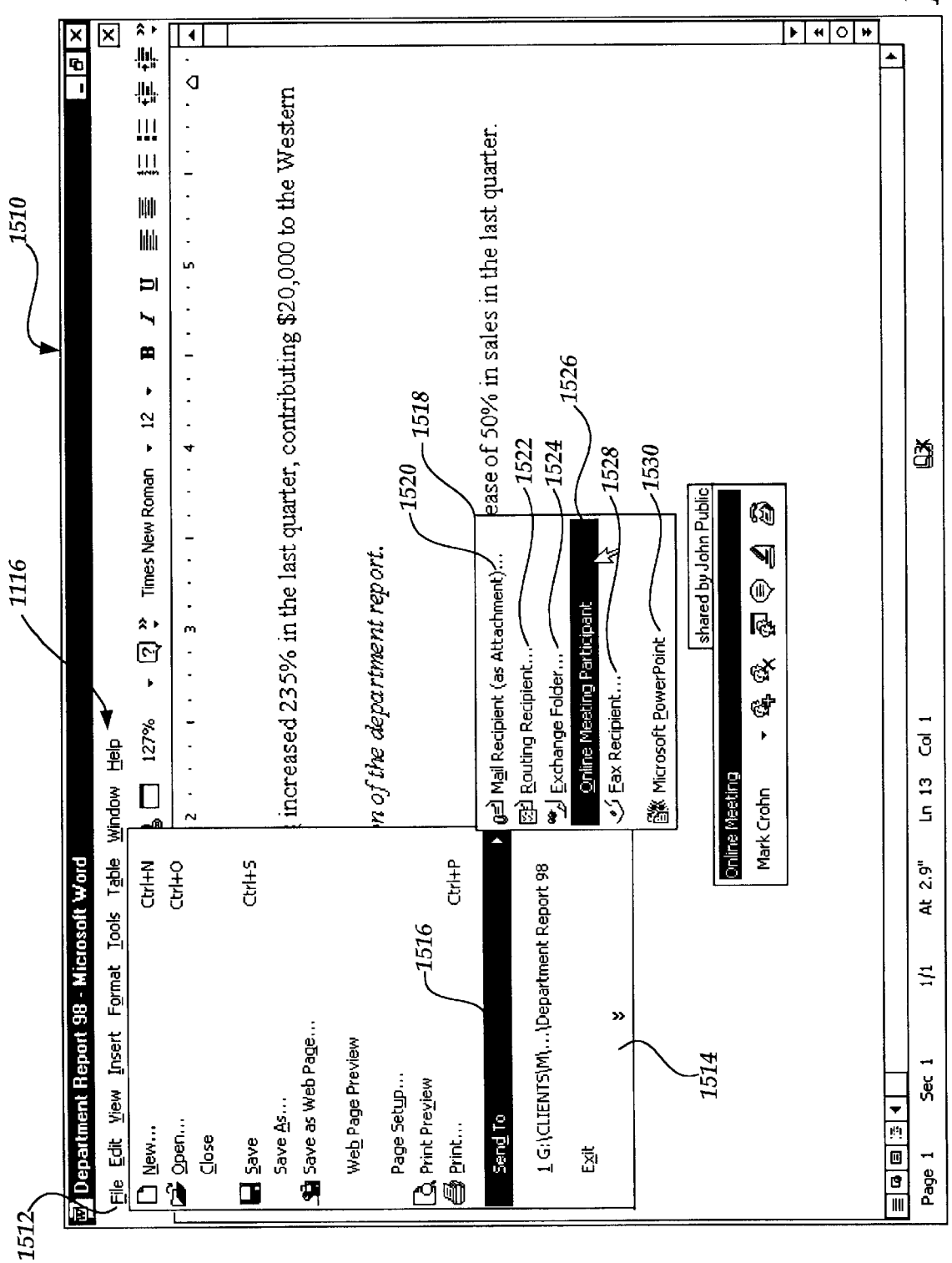
FIG. 9A is a pictorial representation of an application user interface provided by a primary application having a supplemental user interface for sending a copy of an electronic document to meeting participants during a virtual meeting.
Figure 9C:
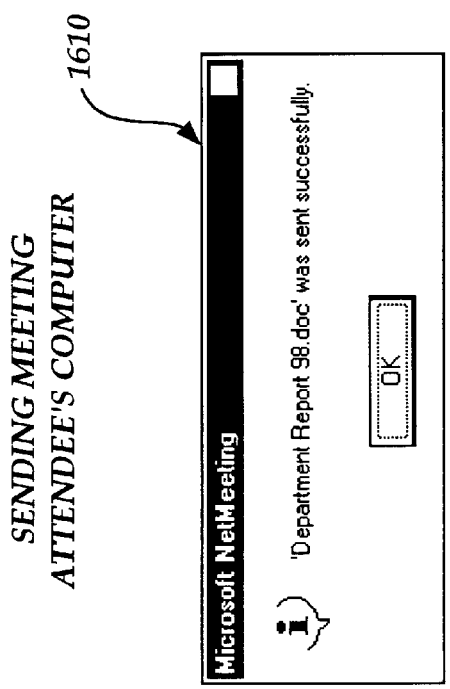
FIG. 9C is a pictorial representation of a transient dialog generated by the virtual meeting application that is displayed on top of a virtual copy of an exemplary primary application shown on a meeting participant's computer during a virtual meeting to indicate the status of a transfer of an electronic document to that meeting participant's computer.
Figure 9B:
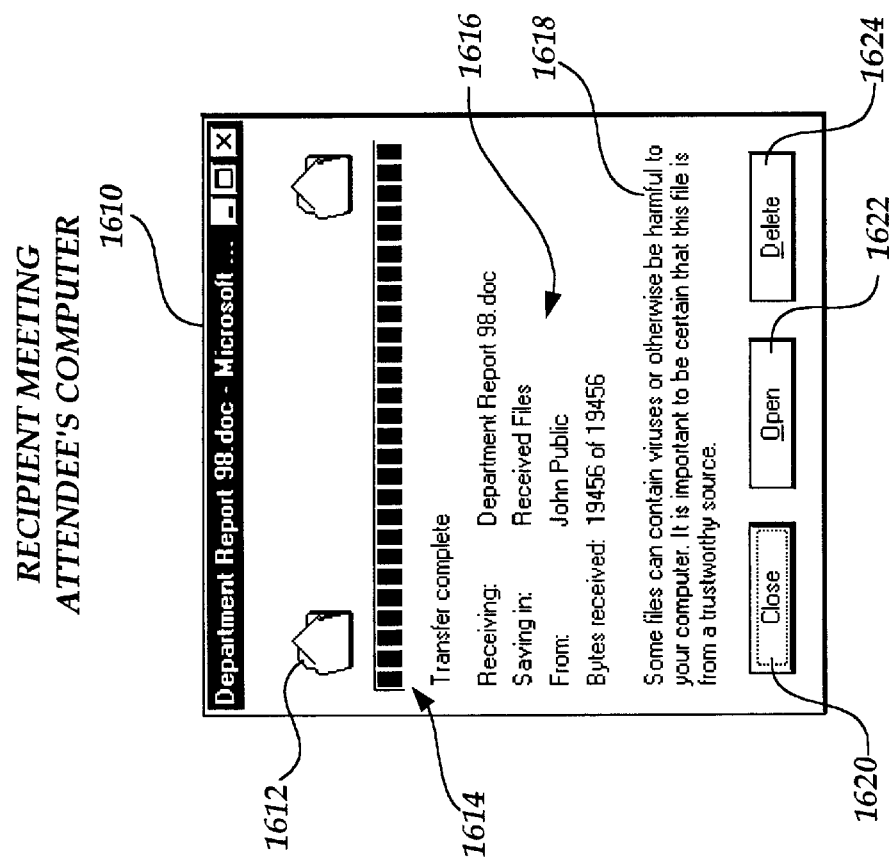
FIG. 9B is a pictorial representation of a transient information dialog generated by the virtual meeting application that is displayed on top of an exemplary primary application to confirm that an electronic document was successfully sent to a meeting participant.

The functionality for transferring files between meeting attendees' computers 1000 and 1004A–B is provided by the virtual meeting application. If a state change request is to transfer a file between meeting participants, a decision 1474 (FIG. 5D) sends 1476 a state change request to the virtual meeting application which enables 1478 file transfer capabilities between the meeting participants' computers. The virtual meeting application generates and administers 1480 a file transfer user interface that is displayed 1482 in (or on top of) the primary application as illustrated in FIGS. 9A–C, discussed below.

The method next checks in a decision 1484 if the state change request is to end the conference. If the state change request is to end the conference, the state change request is sent 1486 to the virtual meeting application, which generates 1488 a confirmation dialog that is then displayed 1490 on top of the primary application. The display confirmation dialog returns a response to the virtual meeting application. If the response is that it is OK to end the virtual meeting, a decision 1492 directs the virtual meeting application to end 1494 the conference and then forwards 1496 a state change event notification that the conference has ended to the primary application. In response, the primary application closes 1498 the supplementary user interface. Following the identification of the state change request in decisions 1410, 1424, 1438, 1458, 1466, 1474, or 1484, the method is then done 1499. While the decisions just mentioned are illustrated in FIGS. 5A–D as being made within the primary application, they may just as easily be made by the virtual meeting application or vice versa.

As mentioned above, a copy of an electronic document may be transferred during a virtual meeting between meeting participants. During the virtual meeting, a virtual copy of the electronic document appears as part of the virtual image of the host display 1020A–B that appears on the meeting attendee's computer 1004A–B during the virtual meeting.

While an electronic document may be edited by a meeting participant during a virtual meeting, a discrete copy of the electronic document is not stored on the meeting attendee's computer unless a copy of it is transferred from the meeting host's computer 1000 to a meeting attendee's computer 1004A–B.

FIG. 9A is also a pictorial representation of the application user interface 1110 shown in FIG. 3 but exposes a different menu in menus 1116. Selection of a Files menu 1512 results in the display of a drop-down menu 1514 that includes a menu item for "Send To" 1516. Selection of the Send To menu item 1516 results in the display of a submenu 1518 that includes menu items: Mail Recipient (as Attachment) 1520, Routing Recipient 1522, Exchange Folder 1524; Online Meeting Participant 1526, Fax Recipient 1528, and Microsoft PowerPoint 1530. Selection of the Online Meeting Participant menu item 1526 automatically sends a copy of electronic document 1016 using by invoking the virtual meeting application 1006A, as is described above. Any electronic document accessible by a meeting attendee may be sent by that meeting attendee to other meeting attendees by selecting the Send To menu item 1516.

As the electronic document 1016 is being sent, the virtual meeting application generates and displays a file transfer information dialog 1610 on the recipient meeting attendee's computer (e.g., 1004A–B) as is shown in FIG. 9B. The file transfer information dialog 1610 includes an animation graphic 1612 active during a file transfer, a progress bar and text message 1614 that informs the meeting attendee of the progress of the transfer; identification information 1616 regarding the electronic document being transferred, instruction information 1618 regarding the transfer process; and command buttons to Close 1620 the file transfer information dialog 1610, Open 1622 the transferred document, or Delete 1624 the transferred document. An exemplary state change message 1630 (FIG. 9C) is generated by the virtual meeting application on the sending meeting attendee's computer (e.g., 1000) indicating the result of the file transfer (e.g., successful or unsuccessful).

FIG. 10 illustrates a document editing application 2002, which in this example is Microsoft Word, available from Microsoft Corporation, Redmond, Wash. The document 1442 has been opened in the document editing application 2002 for collaborative editing. The online meeting toolbar 2004 is displayed within the document editing application 2002, together with a display banner 2006 that displays the name of the meeting host. To illustrate the collaborative editing of the document 1442, assume that the material from the Western region 2008 is entered into the document 1442 from the meeting host's computer 1000 while the material from the Eastern region 2010 is typed into the document 1442 during the same virtual meeting from a meeting attendee's computer, e.g., 1004B.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for forming an instance of a virtual meeting and then sharing the instance of a virtual meeting between a plurality of computer applications, comprising:

providing a first computer application that will be shared by a plurality of meeting participants' computers during the instance of the virtual meeting, the first computer application having a first user interface;

providing a virtual meeting application for forming and administering the instance of the virtual meeting, the virtual meeting application having a virtual meeting user interface and an application interface;

under the control of the first computer application, invoking the virtual meeting application through the application interface; and under the control of the virtual meeting application, forming and administering the instance of the virtual meeting.

2. The method of claim 1, further comprising sending at least one state notification including a transient state information concerning the instance of the virtual meeting from the virtual meeting application to the first computer application.

3. The method of claim 2, wherein the first computer application displays a supplemental user interface in response to the transient state information.

4. The method of claim 3, further comprising a computer readable medium having computer executable instructions for providing the execution of the foregoing method.

5. The method of claim 1, further comprising displaying a portion of the virtual meeting user interface as part of the first user interface.

6. The method of claim 5, further comprising a computer readable medium having computer executable instructions for providing the execution of the foregoing method.

7. The method of claim 5, wherein the portion of the virtual meeting user interface is application modal to the first computer application.

8. The method of claim 5, wherein the portion of the virtual meeting user interface includes the display of the transient state information.

9. The method of claim 8, wherein the portion of the virtual meeting user interface is application modal to the first computer application.

10. The method of claim 8, wherein the portion of the virtual meeting user interface comprises an always on top window.

11. The method of claim 10, further comprising suppressing a selected component of the virtual meeting user interface when the virtual meeting application is invoked by the first computer application through the application interface.

12. The method of claim 11, wherein the virtual meeting application exposes a plurality of application interfaces and each application interface defines an associated predefined mode that specifies the components of the virtual meeting user interface that will be suppressed when the virtual meeting application is invoked by way of the first computer application through an application interface associated with that predefined mode.

13. The method of claim 11, wherein the virtual meeting user interface displays the transient state information.

14. The method of claim 11, wherein a meeting state is controlled through the virtual meeting user interface.

15. The method of claim 14, further comprising displaying a supplementary meeting user interface provided by the first computer application in response to the transient state information.

16. The method of claim 15, further comprising hiding the virtual meeting user interface from the user when the virtual meeting application is invoked by the first computer application and the virtual meeting application was not running at the time that the virtual meeting application was invoked by the first computer application.

17. The method of claim 16, further comprising attaching a second computer application having a second computer application user interface to the virtual meeting by way of the second computer application user interface.

18. The method of claim 16, further comprising loading by way of the first computer application a second instance of the virtual meeting application for facilitating a second virtual meeting.

19. The method of claim 18, further comprising sending a state notification to the first computer application when the first computer application invokes the virtual meeting application.

20. The method of claim 15, further comprising:
displaying a supplementary meeting user interface provided by the first computer application;
accepting state change information from the supplementary meeting user interface; and
sending the state change information from the first computer application to the virtual meeting application.

21. The method of claim 20, further comprising changing the state of the virtual meeting with the virtual meeting application in response to the state change information that was sent by the first computer application from the supplementary meeting user interface.

22. The method of claim 1, further comprising sharing an electronic document for collaborative editing of an electronic document between a plurality of meeting attendees during the virtual meeting.

23. The method of claim 22, wherein the virtual meeting application displays a virtual image of the first computer application on a meeting attendee's computer, a meeting attendee being able to collaboratively edit the electronic document using the first computer application when the virtual meeting attendee is granted control of the first computer application by the virtual meeting application.

24. The method of claim 23, further comprising displaying a click to take control user interface as the selected component of the virtual meeting user interface provided by the virtual meeting application when the virtual meeting application detects that the virtual meeting attendee requests to take control of the first computer application.

25. The method of claim 23, further comprising displaying a meeting attendee user interface as the selected component of the virtual meeting user interface provided by the virtual meeting application modal to the first computer application as meeting attendees are added and removed from the virtual meeting by the virtual meeting application.

26. The method of claim 23, further comprising displaying a call progress user interface as the selected component of the virtual meeting user interface provided by the virtual meeting application modal to the first computer application as the virtual meeting application establishes the virtual meeting.

27. The method of claim 23, further comprising displaying a call failure user interface as the selected component of the virtual meeting user interface provided by the virtual meeting application modal to the first computer application as the virtual meeting application fails to establish the virtual meeting.

28. The method of claim 1, further comprising transferring the file containing the electronic document from a meeting host's computer on which the first computer application is running to a meeting attendee's computer using the virtual meeting application.

29. The method of claim 28, wherein the transfer of the file containing the electronic document is initiated when a file transfer option is selected from the supplementary meeting user interface.

30. The method of claim 1, further comprising sending the state notification to a plurality of computer applications that have registered for the virtual meeting.

31. The method of claim 1, further comprising a computer readable medium having computer executable instructions for providing the execution of the foregoing method.

32. A computer-implemented method for accessing a virtual meeting capability of a virtual meeting application from a document editing application, the method comprising:
displaying a menu as part of a document editing application user interface, the menu including a menu item for initiating a virtual meeting;
receiving in the document editing application a selection of the menu item for initiating a virtual meeting; and
invoking the virtual meeting application from the document editing application, the virtual meeting application being invoked by the document editing application in a mode that displays a set of dialogs in the user interface, the set of dialogs being generated by the virtual meeting application.

33. The method of claim 32, wherein the dialogs generated by the virtual meeting application are modal to the document editing application.

34. The method of claim 33, wherein the dialogs generated by the virtual meeting application and displayed in the document editing application include:
a place call dialog for joining a meeting participant to the virtual meeting, the place call dialog receiving a user selection of at least one meeting attendee;
a call progress dialog that displays state information pertaining to a state of the virtual meeting;
a call success dialog if the virtual meeting application is able to join the virtual meeting attendee to the virtual meeting; and
a call failure dialog if the virtual meeting application is unable to join the virtual meeting attendee to the virtual meeting.

35. The method of claim 32, further comprising:
sending a handle associated with the document editing application to the virtual meeting application, the virtual meeting application using the handle to enable sharing of the document editing application among selected meeting attendees that are joined to the virtual meeting.

36. The method of claim 35, wherein the dialogs generated by the virtual meeting application and displayed in the document editing application include:
a click to take control dialog that is displayed in the document editing application when the virtual meeting application has granted control of the document editing application to a meeting attendee.

37. The method of claim 32, further comprising:
sending virtual meeting state notifications from the virtual meeting application to the document editing application; and
displaying in the user interface a supplementary virtual meeting dialog, the document editing application generating the supplementary virtual meeting dialog in response to the virtual meeting state notification received from the virtual meeting application.

38. The method of claim 35, wherein the dialogs generated by the virtual meeting application and displayed in the document editing application include:
a file transfer capability; and
an incoming file transfer dialog that is displayed when the virtual meeting application detects that a file has been transferred from a meeting host.

39. The method of claim 32, further comprising:

specifying an electronic document to be shared during the virtual meeting in a message sent automatically by the document editing application to the virtual meeting application; and enabling data sharing of the electronic document during the virtual meeting, the data sharing being under the control of the virtual meeting application.

40. The method of claim 39, further comprising displaying as part of a document editing application user interface a portion of a meeting user interface that provides instructions to a user for how to alter the virtual meeting state.

41. The method of claim 39, further comprising displaying as part of the document editing application user interface a portion of a meeting user interface that displays information pertaining to the virtual meeting state.

42. The method of claim 41, further comprising a computer readable medium having computer executable instructions for providing the execution of the foregoing method.

* * * * *

UNITED STATES PATENT AND TRADEMARK OFFICE
CERTIFICATE OF CORRECTION

PATENT NO. : 6,629,129 B1
DATED : September 30, 2003
INVENTOR(S) : M.D. Bookspan et al.

It is certified that error appears in the above-identified patent and that said Letters Patent is hereby corrected as shown below:

<u>Title page,</u>
Item [75], Inventors, "Robert. D. Donner, " should read -- Robert D. Donner, --
*Assistant Examiner*, "Phuoc H Nguyen" should read -- Phuoc H. Nguyen --
Item [57], ABSTRACT,
Line 4, "is provided." should read -- are provided. --
Line 9, "to state change" should read -- to a state change --

<u>Column 2,</u>
Line 60, "the meeting host must also understand" should read -- but also understand --

<u>Column 3,</u>
Line 4, "and should appear" should read -- and it should appear --
Line 19, "as is most" should read -- as are most --
Line 37, "and the virtual meeting." should read -- and the virtual meeting --

<u>Column 4,</u>
Line 9, "or, end" should read -- or end --
Line 33, "meeting participant's" should read -- meeting participants' --
Line 57, "component that will be" should read -- components will be --
Line 62, "relevant to the formation" should read -- relevant to formation --

<u>Column 5,</u>
Lines 26 and 31, "illustrates" should read -- illustrate --

<u>Column 6,</u>
Line 23, "attendee's computers." should read -- attendees' computers. --

<u>Column 7,</u>
Line 4, "network Process," should read -- network process, --
Line 22, "that helps" should read -- that help --
Line 29, "CD ROM" should read -- CD-ROM --
Line 39, "magnetic. disk" should read -- magnetic disk --
Line 45, "(ROM)," should read -- (ROMs), --

<u>Column 8,</u>
Line 41, "assistance" should read -- assistants --

<u>Column 9,</u>
Line 3, "email" should read -- e-mail --
Line 32, "includes menu items:" should read -- includes the following menu items: --

<u>Column 10,</u>
Line 8, "applications user interface." should read -- application's user interface. --

UNITED STATES PATENT AND TRADEMARK OFFICE
CERTIFICATE OF CORRECTION

PATENT NO. : 6,629,129 B1
DATED : September 30, 2003
INVENTOR(S) : M.D. Bookspan et al.

It is certified that error appears in the above-identified patent and that said Letters Patent is hereby corrected as shown below:

Column 10 (cont'd),
Line 14, "application user interface," should read -- application's user interface,--
Line 47, "Otherwise, a decision" should read -- Otherwise, at a decision --
Line 61, "applications user interface" should read -- application's user interface --

Column 11,
Line 20, "applications user interface." should read -- application's user interface. --
Line 45, "which is discussed" should read -- which are discussed --

Column 12,
Line 17, "by decision 1256" should read -- by decision 1256, --
Line 30, "embodiment in" should read -- embodiment of --

Column 13,
Line 16, "Like above," should read -- As discussed above, --
Line 16, "virtual meetings user" should read -- virtual meeting's user --

Column 14,
Line 3, "as is required" should read -- as required --
Line 16, "as is" should read -- as --
Line 29, "as is necessary." should read -- as necessary. --

Column 15,
Line 8, "but exposes" should read -- but it exposes --
Line 18, "1016 using by invoking" should read -- 1016 invoking --
Line 19, "as is described" should read -- as described --
Line 28, "file transfer," should read -- file transfer; --
Line 31, "being transferred," should read -- being transferred; --

Signed and Sealed this

Tenth Day of February, 2004

JON W. DUDAS
*Acting Director of the United States Patent and Trademark Office*